(12) United States Patent
Honjo et al.

(10) Patent No.: US 11,522,849 B2
(45) Date of Patent: Dec. 6, 2022

(54) AUTHENTICATION SYSTEM AND COMPUTER READABLE MEDIUM

(71) Applicant: MITSUBISHI ELECTRIC CORPORATION, Tokyo (JP)

(72) Inventors: Masaya Honjo, Tokyo (JP); Mitsuhiro Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 131 days.

(21) Appl. No.: 17/002,629

(22) Filed: Aug. 25, 2020

(65) Prior Publication Data

US 2021/0006555 A1 Jan. 7, 2021

Related U.S. Application Data

(63) Continuation of application No. PCT/JP2018/014948, filed on Apr. 9, 2018.

(51) Int. Cl.
| | |
|---|---|
| *H04L 29/06* | (2006.01) |
| *H04L 9/40* | (2022.01) |
| *H04L 9/06* | (2006.01) |
| *H04L 9/32* | (2006.01) |
| *H04L 9/00* | (2022.01) |

(52) U.S. Cl.
CPC ........ *H04L 63/0823* (2013.01); *H04L 9/0643* (2013.01); *H04L 9/3263* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2015/0082032 A1 | 3/2015 | Bruce et al. | |
| 2016/0248759 A1 | 8/2016 | Tsurumi et al. | |
| 2016/0328713 A1* | 11/2016 | Ebrahimi | G06K 19/06037 |
| 2017/0359185 A1* | 12/2017 | Hang | H04L 9/3226 |
| 2018/0137512 A1* | 5/2018 | Georgiadis | H04L 9/3239 |
| 2018/0205555 A1 | 7/2018 | Watanabe et al. | |
| 2018/0241551 A1 | 8/2018 | Fujimura et al. | |
| 2018/0278427 A1* | 9/2018 | Thakore | H04L 9/3239 |

FOREIGN PATENT DOCUMENTS

| | | | |
|---|---|---|---|
| JP | 2003-244134 A | | 8/2003 |
| JP | 2003244134 A | * | 8/2003 |
| JP | 2011-71721 A | | 4/2011 |

(Continued)

OTHER PUBLICATIONS

International Search Report for PCT/JP2018/014948 (PCT/ISA/210) dated Jul. 10, 2018.

*Primary Examiner* — Wasika Nipa
*Assistant Examiner* — Mayasa A. Shaawat
(74) *Attorney, Agent, or Firm* — Birch, Stewart, Kolasch & Birch, LLP

(57) ABSTRACT

In an authentication system (120) of a first organization that a first user belongs to, when the first user accesses a service of another organization from a user terminal of the first organization, an authentication device (300) receives a hello message from another organization system, encrypts the hello message using a client private key of the first user, and sends the encrypted hello message to said another organization system as a signature message.

12 Claims, 24 Drawing Sheets

(56) References Cited

FOREIGN PATENT DOCUMENTS

| | | | |
|---|---|---|---|
| JP | 2011-238083 A | 11/2011 | |
| JP | 2015-57704 A | 3/2015 | |
| JP | 2015-90620 A | 5/2015 | |
| JP | 2017-50763 A | 3/2017 | |
| WO | WO 2017/010455 A1 | 1/2017 | |
| WO | WO-2018160863 A1 * | 9/2018 | ......... H04L 63/0823 |

* cited by examiner

AUTHENTICATION SYSTEM AND COMPUTER READABLE MEDIUM

CROSS REFERENCE TO RELATED APPLICATION

This application is a Continuation of PCT International Application No. PCT/JP2018/014948, filed on Apr. 9, 2018, which is hereby expressly incorporated by reference into the present application.

TECHNICAL FIELD

The present invention relates to a technique for authentication federation.

BACKGROUND ART

When using services of a plurality of organizations by PK1 authentication, a user of each organization needs to be issued with client certificates as many as the number of terminals the user utilizes. This lacks convenience. PK1 stands for Public Key Infrastructure.

Patent Literature 1 discloses a method that does not use a plurality of client certificates.

In this method, an authentication federation apparatus presents to a service providing device a user of a terminal in which the certificate is installed. Thus, the user can utilize a plurality of terminals with one piece of personal authentication information. For example, the personal authentication information is a pair of an identifier (ID) and a password, or a pair of a private key and a public key.

CITATION LIST

Patent Literature

Patent Literature 1: JP 2011-238083 A

SUMMARY OF INVENTION

Technical Problem

In the method disclosed in Patent Literature 1, it is necessary to perform device authentication independently of user authentication. Also, a device authentication apparatus is required for device authentication. Furthermore, for device authentication, it is necessary to save a device key, a digital certificate, or the like in a device and the device authentication apparatus. That is, when adding a new device, it takes a lot of time and labor to save the device key, the electronic certificate, or the like in the new device.

The present invention has as its objective to enable authentication of a user when the user accesses a service of another organization from a user terminal (an example of the device), even if a device key, a digital certificate, or the like is not saved in the user terminal for device authentication.

Solution to Problem

An authentication system of the present invention is an authentication system of a first organization that a first user belongs to.

The authentication system includes a proxy certification unit to receive a hello message from another organization system when the first user accesses a service of another organization from a user terminal of the first organization, to encrypt the hello message using a client private key of the first user, and to send the encrypted hello message to said another organization system as a signature message.

Advantageous Effects of Invention

According to the present invention, it is possible to authenticate a user when the user accesses a service of another organization from a user terminal (an example of a device), even if a device key, a digital certificate, or the like is not saved in the user terminal for device authentication.

DESCRIPTION OF EMBODIMENTS

Figure 1:
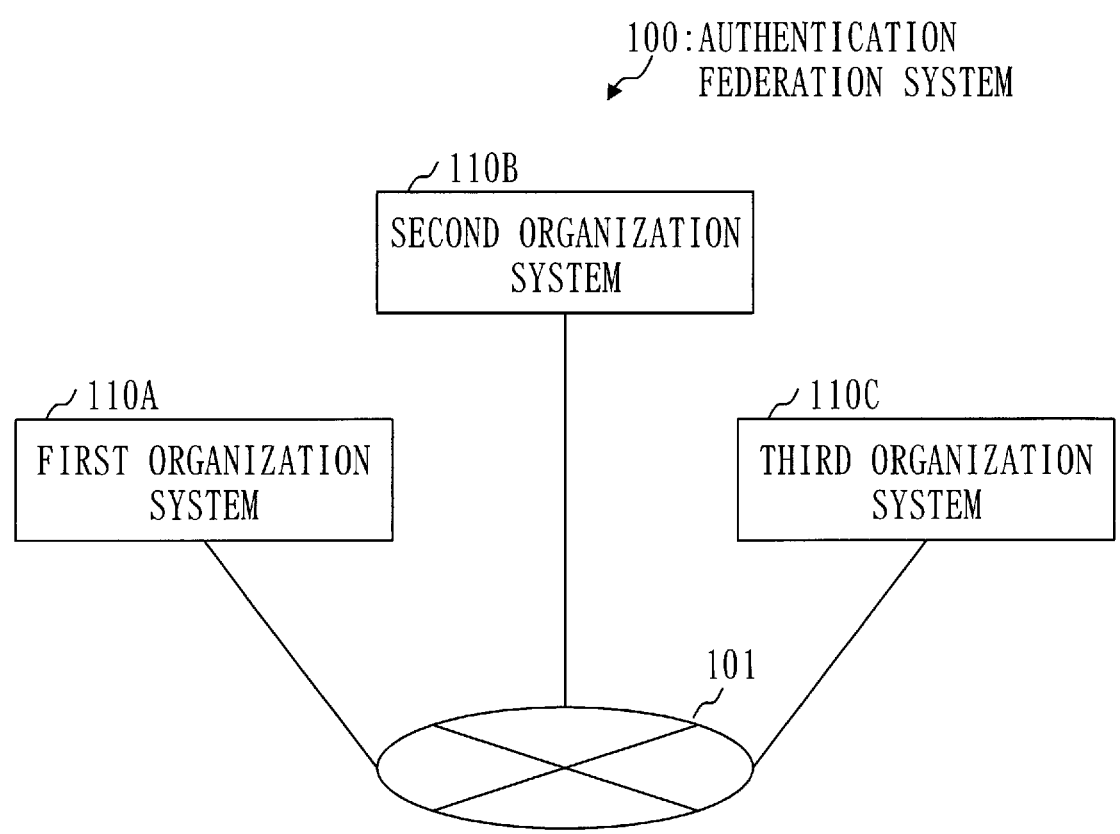
FIG. 1 is a configuration diagram of an authentication federation system 100 in Embodiment 1.

In the embodiments and drawings, the same elements and equivalent elements are denoted by the same reference sign.

Description of an element denoted by the same reference sign will be appropriately omitted or simplified. Arrows in the drawings mainly indicate data flows or process flows.

Embodiment 1

An authentication federation system 100 will be described with referring to FIGS. 1 to 18.

* Description of Configuration *

A configuration of the authentication federation system 100 will be described with referring to FIG. 1.

The authentication federation system 100 is provided with a plurality of organization systems.

The plurality of organization systems communicate with each other via the Internet 101. The Internet 101 is an example of a network.

An organization system is a computer system in an organization.

In Embodiment 1, the authentication federation system 100 is provided with a first organization system 110A, a second organization system 110B, and a third organization system 110C.

The first organization system 110A is a computer system of a first organization.

The second organization system 110B is a computer system of a second organization.

The third organization system 110C is a computer system of a third organization.

There may be two organization systems, or four organization systems or more.

When the organization systems are not specified, each organization system will be referred to as an organization system 110.

A configuration of the organization system 110 will be described with referring to FIG. 2.

The organization system 110 is provided with an authentication system 120, a user terminal group 130G, a server device group 140G, and a gateway device 112.

The authentication system 120, the user terminal group 130G, the server device group 140G, and the gateway device 112 communicate with each other via an intranet 111. The intranet 111 is an example of a network.

The authentication system 120, the user terminal group 130G, and the server device group 140G communicate with the other organization systems 110 via the intranets 111, the gateway devices 112, and the Internet 101.

The user terminal group 130G consists of one user terminal or more.

When user terminals are not specified, each user terminal will be referred to as a user terminal 130.

The server device group 140G consists of one server device or more. The server device is a device that provides a service. The server device is called an application server or a service providing device as well.

When server devices are not specified, each server device will be referred to as a server device 140.

A configuration of the user terminal 130 will be described with referring to FIG. 3.

The user terminal 130 is a computer provided with hardware devices such as a processor 131A, a memory 131B, an auxiliary storage device 131C, a communication device 131D, and an input/output interface 131E. These hardware devices are connected to each other via signal lines.

The processor 131A is an Integrated Circuit (IC) which performs arithmetic processing, and controls the other hardware devices. For example, the processor 131A is a Central Processing Unit (CPU), a Digital Signal Processor (DSP), or a Graphics Processing Unit (GPU). The processor 131A implements a function of a browser unit 132.

The memory 131B is a volatile storage device. The memory 131B is also called a main storage device or a main memory. For example, the memory 131B is a Random-Access Memory (RAM). Data stored in the memory 131B is saved in the auxiliary storage device 131C as necessary.

The auxiliary storage device 131C is a nonvolatile storage device. For example, the auxiliary storage device 131C is a Read-Only Memory (ROM), a Hard Disk Drive (HDD), or a flash memory. Data stored in the auxiliary storage device 131C is loaded in the memory 131B as necessary.

The communication device 131D is a receiver/transmitter. For example, the communication device 131D is a communication chip or a Network Interface card (NIC).

The input/output interface 131E is a port to which an input device and an output device are to be connected. For example, the input/output interface 131E is a USB terminal, the input device includes a keyboard and a mouse, and the output device is a display. Note that USB stands for Universal Serial Bus.

A configuration of the server device 140 will be described with referring to FIG. 4.

The server device 140 is a computer provided with hardware devices such as a processor 141A, a memory 141B, an auxiliary storage device 141C, and a communication device 141D. These hardware devices are connected to each other via signal lines.

The processor 141A is an IC which performs arithmetic processing, and controls the other hardware devices. For example, the processor 141A is a CPU, a DSP, or a GPU. The processor 141A implements a function of an application unit 142.

The memory 141B is a volatile storage device. The memory 141B is also called a main storage device or a main memory. For example, the memory 141B is a RAM. Data stored in the memory 141B is saved in the auxiliary storage device 141C as necessary.

The auxiliary storage device 141C is a nonvolatile storage device. For example, the auxiliary storage device 141C is a ROM, an HDD, or a flash memory. Data stored in the auxiliary storage device 141C is loaded in the memory 141B as necessary.

The communication device 141D is a receiver/transmitter. For example, the communication device 141D is a communication chip or an NIC.

A configuration of the authentication system 120 will be described with referring to FIG. 5.

The authentication system 120 is provided with a management device 200, an authentication device 300, and a certificate authority device 400.

The authentication device 300 communicates with the management device 200 and the certificate authority device 400 via the intranet 111.

A configuration of the management device 200 will be described with referring to FIG. 6.

The management device 200 is a computer provided with hardware devices such as a processor 201, a memory 202, an auxiliary storage device 203, and a communication device 204. These hardware devices are connected to each other via signal lines.

The processor 201 is an IC which performs arithmetic processing, and controls the other hardware devices. For example, the processor 201 is a CPU, a DSP, or a GPU.

The memory 202 is a volatile storage device. The memory 202 is also called a main storage device or a main memory.

For example, the memory 202 is a RAM. Data stored in the memory 202 is saved in the auxiliary storage device 203 as necessary.

The auxiliary storage device 203 is a nonvolatile storage device. For example, the auxiliary storage device 203 is a ROM, an HDD, or a flash memory. Data stored in the auxiliary storage device 203 is loaded in the memory 202 as necessary.

The communication device 204 is a receiver/transmitter. For example, the communication device 204 is a communication chip or an NIC.

The management device 200 is provided with elements such as a transaction issuing unit 211, a transaction accepting unit 212, a certificate verification unit 213, a blockchain management unit 214, and a transaction verification unit 215. These elements are implemented by software.

In the auxiliary storage device 203, a program to cause the computer to function as the transaction issuing unit 211, the transaction accepting unit 212, the certificate verification unit 213, the blockchain management unit 214, and the transaction verification unit 215 is stored. The program is loaded in the memory 202 and executed by the processor 201.

Furthermore, an Operating System (OS) is stored in the auxiliary storage device 203. The OS is at least partly loaded in the memory 202 and executed by the processor 201.

In other words, the processor 201 executes the program while executing the OS.

Data obtained by executing the program is stored in a storage device such as the memory 202, the auxiliary storage device 203, a register in the processor 201, and a cache memory in the processor 201.

The memory 202 functions as a blockchain storage unit 290. Note that another storage device may function as the blockchain storage unit 290 in place of the memory 202 or along with the memory 202.

The management device 200 may be provided with a plurality of processors that substitute for the processor 201. The plurality of processors share a role of the processor 201.

The program can be computer readably recorded (stored) in a nonvolatile recording medium such as an optical disk and a flash memory.

A configuration of the authentication device 300 will be described with referring to FIG. 7.

The authentication device 300 is a computer provided with hardware devices such as a processor 301, a memory 302, an auxiliary storage device 303, and a communication device 304. These hardware devices are connected to each other via signal lines.

The processor 301 is an IC which performs arithmetic processing, and controls the other hardware devices. For example, the processor 301 is a CPU, a DSP, or a GPU.

The memory 302 is a volatile storage device. The memory 302 is also called a main storage device or a main memory. For example, the memory 302 is a RAM. Data stored in the memory 302 is saved in the auxiliary storage device 303 as necessary.

The auxiliary storage device 303 is a nonvolatile storage device. For example, the auxiliary storage device 303 is a ROM, an HDD, or a flash memory. Data stored in the auxiliary storage device 303 is loaded in the memory 302 as necessary.

The communication device 304 is a receiver/transmitter. For example, the communication device 304 is a communication chip or an NIC.

The authentication device 300 is provided with elements such as an authentication unit 311, a proxy certification unit 312, and a logout accepting unit 313. These elements are implemented by software.

In the auxiliary storage device 303, a program to cause the computer to function as the authentication unit 311, the proxy certification unit 312, and the logout accepting unit 313 is stored. The program is loaded in the memory 302 and executed by the processor 301.

Furthermore, an OS is stored in the auxiliary storage device 303. The OS is at least partly loaded in the memory 302 and executed by the processor 301.

In other words, the processor 301 executes the program while executing the OS.

Data obtained by executing the program is stored in a storage device such as the memory 302, the auxiliary storage device 303, a register in the processor 301, and a cache in the processor 301.

The memory 302 functions as an authentication information storage unit 391 and a client private key storage unit 392. Note that another storage device may function as the authentication information storage unit 391 and the client private key storage unit 392 in place of the memory 302 or along with the memory 302.

The authentication device 300 may be provided with a plurality of processors that substitute for the processor 301. The plurality of processors share a role of the processor 301.

The program can be computer readably recorded (stored) in a nonvolatile recording medium such as an optical disk and a flash memory.

A configuration of the certificate authority device 400 will be described with referring to FIG. 8.

The certificate authority device 400 is a computer provided with hardware devices such as a processor 401, a memory 402, an auxiliary storage device 403, and a communication device 404. These hardware devices are connected to each other via signal lines.

The processor 401 is an IC which performs arithmetic processing, and controls the other hardware devices. For example, the processor 401 is a CPU, a DSP, or a GPU.

The memory 402 is a volatile storage device. The memory 402 is also called a main storage device or a main memory. For example, the memory 402 is a RAM. Data stored in the memory 402 is saved in the auxiliary storage device 403 as necessary.

The auxiliary storage device 403 is a nonvolatile storage device. For example, the auxiliary storage device 403 is a ROM, an HDD, or a flash memory. Data stored in the auxiliary storage device 403 is loaded in the memory 402 as necessary.

The communication device 404 is a receiver/transmitter. For example, the communication device 404 is a communication chip or an NIC.

The certificate authority device 400 is provided with elements such as a private key generation unit 411 and a certificate generation unit 412. These elements are implemented by software.

In the auxiliary storage device 403, a program to cause the computer to function as the private key generation unit 411 and the certificate generation unit 412 is stored. The program is loaded in the memory 402 and executed by the processor 401.

Furthermore, an OS is stored in the auxiliary storage device 403. The OS is at least partly loaded in the memory 402 and executed by the processor 401.

In other words, the processor 401 executes the program while executing the OS.

Data obtained by executing the program is stored in a storage device such as the memory 402, the auxiliary storage device 403, a register in the processor 401, and a cache memory in the processor 401.

The memory 402 functions as a certificate authority private key storage unit 490. Note that another storage device may function as the certificate authority private key storage unit 490 in place of the memory 402 or along with the memory 402.

The certificate authority device 400 may be provided with a plurality of processors that substitute for the processor 401. The plurality of processors share a role of the processor 401.

The program can be computer readably recorded (stored) in a nonvolatile recording medium such as an optical disk and a flash memory.

* Description of Operations *

An operation of the authentication federation system 100 corresponds to an authentication federation method.

An operation of the authentication system 120 corresponds to an authentication method. A procedure of the authentication method corresponds to a procedure of an authentication program.

The authentication program can be computer readably recorded (stored) in a nonvolatile recording medium such as an optical disk and a flash memory.

Concerning the authentication federation method and the authentication method, the following matters will be described.

(1) Construction of Blockchain
(2) Participation in Blockchain
(3) Registration of Certificate authority Certificate
(4) Issue of Client Certificate
(5) Proxy Certification of User
(6) Logout of User In the embodiment, BC signifies blockchain, CA signifies certificate authority, and CL signifies client. Signature signifies digital signature.

First, description will be made on (1) Construction of Blockchain.

A certificate authority certificate blockchain, a client certificate blockchain, and a revocation list blockchain are constructed in the authentication federation system 100.

The certificate authority certificate blockchain is a blockchain for a certificate authority certificate.

The client certificate blockchain is a blockchain for a client certificate.

The revocation list blockchain is a blockchain for a revocation list. A revocation list is a list of revoked client certificates.

In each authentication system 120, a pair of a blockchain private key and a blockchain certificate is prepared. The pair of the blockchain private key and the blockchain certificate is commonly used by the certificate authority certificate blockchain, the client certificate blockchain, and the revocation list blockchain.

The pair of the blockchain private key and the blockchain certificate is stored in the blockchain storage unit 290. That is, in the authentication system 120 of a first organization, a pair of a blockchain private key for the first organization and a blockchain certificate for the first organization is stored in the blockchain storage unit 290. In the authentication system 120 of a second organization, a pair of a blockchain private key for the second organization and a blockchain certificate for the second organization is stored in the blockchain storage unit 290. In the authentication system 120 of a third organization, a pair of a blockchain private key for the third organization and a blockchain certificate for the third organization is stored in the blockchain storage unit 290.

The pair of the blockchain private key and the blockchain certificate is generated in a different manner according to a blockchain implementation method. For example, the authentication system 120 generates the pair of the blockchain private key and a blockchain certificate by itself. Alternatively, a representative certificate authority generates the pair of the blockchain private key and the blockchain certificate for each authentication system 120.

The following description will be given based on a premise that the pair of blockchain private key and the blockchain certificate is commonly used by the certificate authority certificate blockchain, the client certificate blockchain, and the revocation list blockchain. However, the pair of the blockchain private key and the blockchain certificate may be different in each of the certificate authority certificate blockchain, the client certificate blockchain, and the revocation list blockchain.

Description will be made on (2) Participation in Blockchain.

Participation in a blockchain is a process for obtaining a right of data registration or a right of data reference to a started blockchain. When the authentication system 120 has obtained the right of data registration by participating in a blockchain, the authentication system 120 can register data in the blockchain. When the authentication system 120 has obtained the right of data reference by participating in a blockchain, the authentication system 120 can refer to data registered in the blockchain.

Each authentication system 120 participates in each of the certificate authority certificate blockchain, the client certificate blockchain, and the revocation list blockchain.

To participate in a blockchain, a blockchain starting process and a blockchain participating process are required.

In the blockchain starting process, a blockchain starting function is utilized. The blockchain starting function is a function of executing a process for starting the blockchain. For example, a program provided to start the blockchain is executed.

In the blockchain participating process, a blockchain participating function is utilized. The blockchain participation function is a function of executing a process for participating in the blockchain. For example, by executing a program provided to participate in the blockchain, an access to a blockchain server is made. Also, participation messages are exchanged according to a communication specification of the blockchain.

How to participate in a blockchain differs depending on the blockchain. For example, the authentication system 120 of the first organization starts a blockchain, and the authentication system 120 of the second organization and the authentication system 120 of the third organizations participate in the blockchain.

In each authentication system 120, a pair of a certificate authority private key and a certificate authority certificate is prepared.

The certificate authority private key is generated by the private key generation unit 411 and stored in the certificate authority private key storage unit 490. That is, in the authentication system 120 of the first organization, a certificate authority private key for the first organization is stored in the certificate authority private key storage unit 490. In the authentication system 120 of the second organization, a certificate authority private key for the second organization is stored in the certificate authority private key storage unit 490. In the authentication system 120 of the third organization, a certificate authority private key for the third organization is stored in the certificate authority private key storage unit 490.

The certificate authority certificate is generated by the certificate generation unit 412. For example, the certificate authority certificate is generated according to the X.509 standard. Also, a blockchain certificate and a client certificate are generated according to, for example, the X.509 standard.

The certificate authority certificate includes a certificate authority public key to be paired with the certificate authority private key. The blockchain certificate includes a blockchain public key to be paired with the blockchain private key. The client certificate includes a client public key to be paired with a client private key.

The pair of the certificate authority private key and the certificate authority public key is generated by an algorithm such as RSA cryptography and elliptic curve cryptography. Also, the pair of blockchain private key and the blockchain public key and the pair of the client private key and the client public key are generated by an algorithm such as RSA cryptography and elliptic curve cryptography. Note that RSA stands for Rivest-Shamir-Adleman cryptosystem.

Description will now be made on (3) Registration of Certificate authority Certificate.

Each authentication system 120 registers a certificate authority certificate in the certificate authority certificate blockchain.

A registration process will be described with referring to FIG. 9 through a case where the certificate authority certificate of the first organization is to be registered in the certificate authority certificate blockchain.

This registration process is a process for (3) Registration of Certificate authority Certificate.

In step S101, a registration transaction for the certificate authority certificate of the first organization is issued.

The registration transaction for the certificate authority certificate is a transaction for registering a certificate authority certificate in a certificate authority certificate blockchain.

A process of step S101 is as follows.

In the authentication system 120 of the first organization, the transaction issuing unit 211 issues the registration transaction for the certificate authority certificate of the first organization. Specifically, the transaction issuing unit 211 generates transaction data 121 and sends the transaction data 121 to each of the other authentication systems 120. The transaction data 121 is sent by a function of the blockchain. The other authentication systems 120 are the authentication system 120 of the second organization and the authentication system 120 of the third organization.

In each of the other authentication systems 120, the transaction accepting unit 212 accepts the registration transaction for the certificate authority certificate of the first organization. Specifically, the transaction accepting unit 212 receives the transaction data 121.

Figure 10:
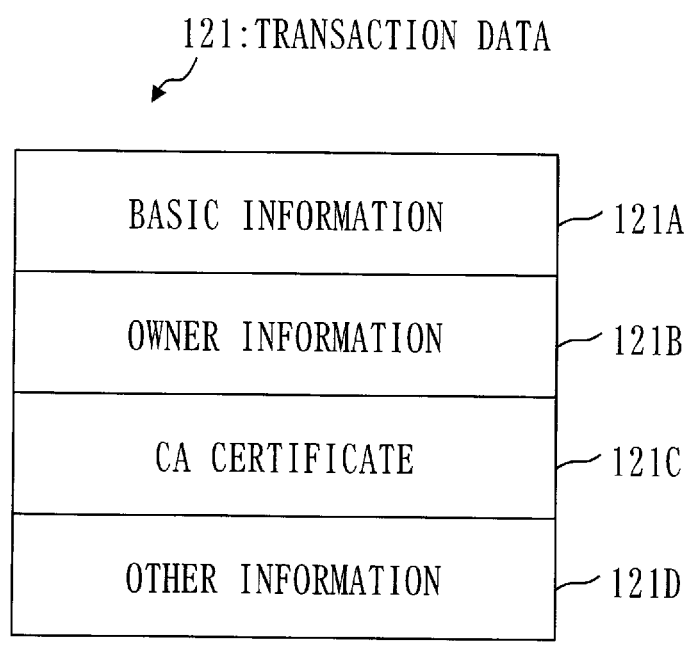
FIG. 10 is a diagram illustrating transaction data 121 in Embodiment 1.

The transaction data 121 will be described with referring to FIG. 10.

The transaction data 121 has basic information 121A, owner information 121B, a certificate authority certificate 121C, and other information 121D.

The basic information 121A includes, for example, a transaction identifier (ID), a blockchain certificate of an issuer, a signature of the issuer, and a timestamp of issue. The issuer is the authentication system 120 of the first organization. The signature of the issuer is generated with using a blockchain private key of the issuer.

The owner information 121B indicates an owner of the certificate authority certificate. The owner is the authentication system 120 of the first organization.

The certificate authority certificate 121C is the certificate authority certificate of the first organization.

Figure 9:
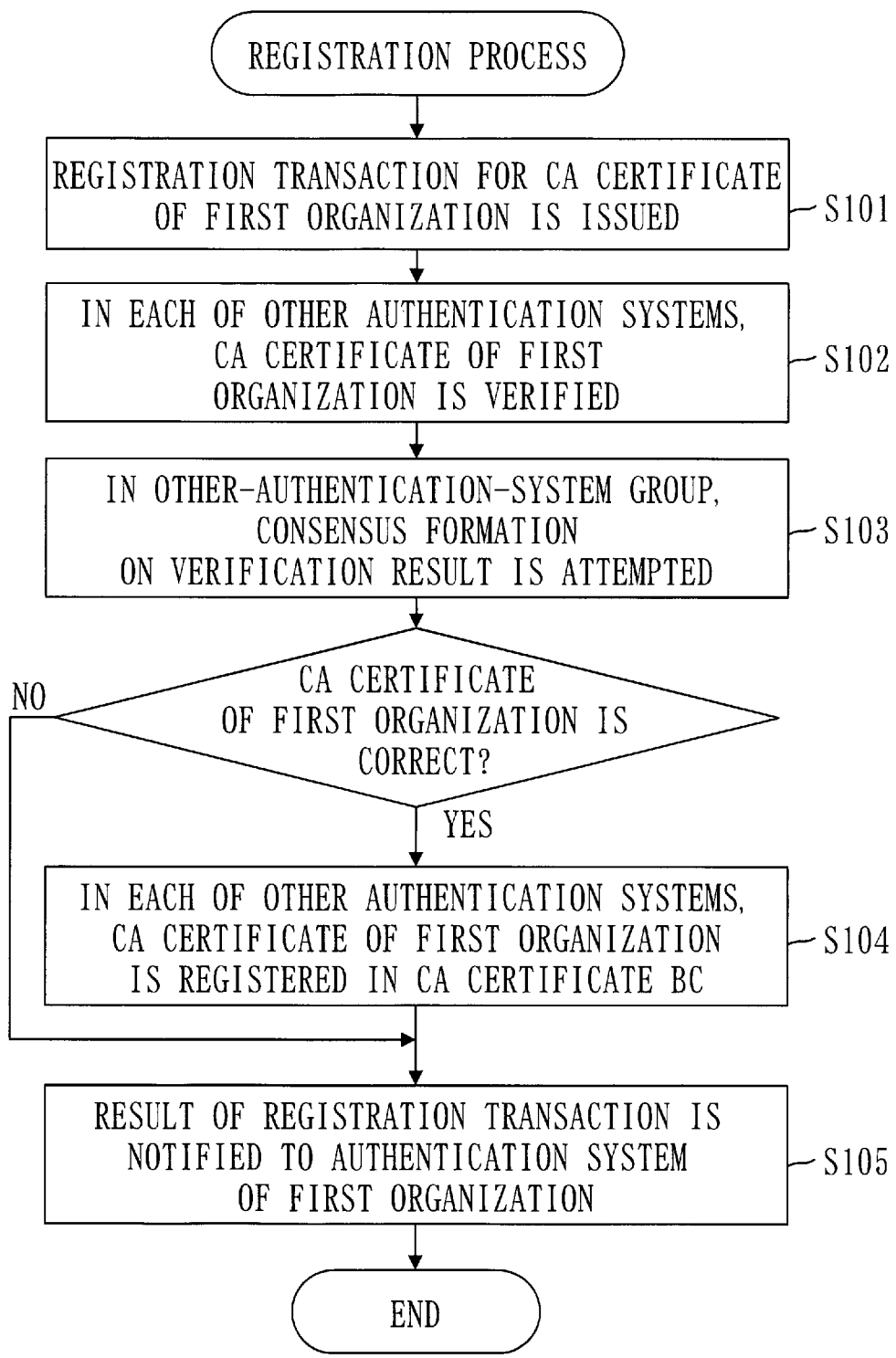
FIG. 9 is a flowchart of a registration process in Embodiment 1.

Back to FIG. 9, the description continues from step S102.

In step S102, the certificate authority certificate of the first organization is verified. That is, the certificate authority certificate 121C included in the transaction data 121 is verified.

A process of step S102 is as follows.

In each of the other authentication systems 120, the certificate verification unit 213 verifies the certificate authority certificate of the first organization. Specifically, the certificate verification unit 213 acquires the certificate authority certificate 121C from the transaction data 121 and verifies the certificate authority certificate 121C.

For example, the certificate verification unit 213 verifies the certificate authority certificate 121C in accordance with at least any one of methods described below. By conducting verification in accordance with a plurality of methods, authenticity of the certificate authority certificate 121C can be confirmed more accurately.

The certificate verification unit 213 confirms a format of the certificate authority certificate 121C. Specifically, the certificate verification unit 213 confirms that the format of the certificate authority certificate 121C matches a prescribed format of a certificate authority certificate.

The certificate verification unit 213 verifies the signature of the issuer listed in the basic information 121A using the certificate authority public key included in the certificate authority certificate 121C.

The certificate verification unit 213 confirms the correctness of the certificate authority certificate 121C. Specifically, the certificate verification unit 213 confirms a content of the certificate authority certificate 121C by communicating with the authentication system 120 of the issuer.

In step S103, consensus formation on a verification result is attempted by an other-authentication-system group. The other-authentication-system group consists of one of the other authentication systems 120 or more. Specifically, the other-authentication-system group consists of all the authentication systems 120 but the authentication system 120 of the first organization. That is, the other-authentication-system group consists of the authentication system 120 of the second organization and the authentication system 120 of the third organization.

A process of step S103 is as follows.

In the other-authentication-system group, one certificate verification unit 213 or more attempt to form the consensus on the verification result by a consensus formation function.

The consensus formation function is called consensus algorithm.

The consensus algorithm differs depending on the type of the blockchain. Examples of a well-known consensus algorithm are Proof of Work (PoW) and Practical Byzantine Fault Tolerance (PBFT).

The certificate authority certificate certifies the certificate authority device 400 of the authentication system 120. Hence, the certificate authority certificate requires a high security.

For example, a consensus that the certificate authority certificate is correct is obtained only when it is decided in all the other authentication systems 120 that the certificate authority certificate is correct.

The processing branches depending on the result of consensus formation.

If a result is obtained that the certificate authority certificate of the first organization is correct, the processing proceeds to step S104.

If a result is obtained that the certificate authority certificate of the first organization is not correct, the certificate authority certificate of the first organization is not registered in the certificate authority certificate blockchain, and the processing proceeds to step S105.

In step S104, the certificate authority certificate of the first organization is registered in the certificate authority certificate blockchain.

A process of step S104 is as follows.

In each of the other authentication systems 120, the blockchain management unit 214 registers the certificate authority certificate of the first organization in the certificate authority certificate blockchain. Specifically, the blockchain management unit 214 stores the certificate authority certificate 121C in the blockchain storage unit 290 as part of the certificate authority certificate blockchain.

In step S105, a result of the registration transaction is notified.

A process of step S105 is as follows.

In each of the other authentication systems 120, the transaction accepting unit 212 sends a registration result notice to the authentication system 120 of the first organization. The registration result notice indicates whether or not the certificate authority certificate of the first organization is registered in the certificate authority certificate blockchain.

In the authentication system 120 of the first organization, the transaction issuing unit 211 receives the registration result notice.

Description will now be made on (4) Issue of Client Certificate.

Each authentication system 120 issues a client certificate for a user in the organization. Issue of a client certificate signifies registration of the client certificate in the client certificate blockchain.

An issue process will be described with referring to FIGS. 11 and 12 through a case where a client certificate is to be issued for a first user belonging to the first organization.

This issue process is a process for (4) Issue of Client Certificate.

In step S201, authentication information of the first user is sent to the authentication system 120 of the first organization.

The authentication information is information for authenticating a user. For example, the authentication information is a pair of a user ID and a password, or is biometric information.

A process of step S201 is as follows.

In the first organization system 110A, the first user inputs the authentication information to the user terminal 130.

The browser unit 132 of the user terminal 130 sends the authentication information to the authentication system 120 of the first organization.

In the authentication system 120 of the first organization, the authentication unit 311 receives the authentication information.

In step S202, the authentication information of the first user is verified.

A process of step S202 is as follows.

In the authentication system 120 of the first organization, authentication information of each user of the first organization is registered in the authentication information storage unit 391 in advance.

The authentication unit 311 checks whether the received authentication information matches any authentication information registered in the authentication information storage unit 391.

If the received authentication information matches some authentication information registered in the authentication information storage unit 391, the authentication information of the user is correct.

If the authentication information of the user is correct, the processing proceeds to step S203.

If the authentication information of the user is not correct, the authentication unit 311 sends an error message to the user terminal 130. The browser unit 132 of the user terminal 130 receives the error message and displays the error message onto the display. Then, the processing proceeds to step S201.

In step S203, a client private key of the first user is generated.

A process of step S203 is as follows.

In the authentication system 120 of the first organization, the authentication unit 311 sends an issue request for issuing the client private key of the first user and a client certificate of the first user. The private key generation unit 411 receives the issue request and generates the client private key of the first user.

In step S204, the client certificate of the first user is generated.

A process of step S204 is as follows.

In the authentication system 120 of the first organization, the certificate generation unit 412 generates a signature using the certificate authority private key of the first organization, and generates the client certificate of the first user.

The client certificate of the first user includes the signature generated with using the certificate authority private key of the first organization.

In step S205, a registration transaction for the client certificate of the first user is issued.

The registration transaction for the client certificate is a transaction for registering a client certificate in the client certificate blockchain.

A process of step S205 is as follows.

In the authentication system 120 of the first organization, the certificate generation unit 412 sends a pair of the client private key and the client certificate, and the authentication unit 311 receives the pair of the client private key and the client certificate. The authentication unit 311 sends the client certificate, and the transaction issuing unit 211 receives the client certificate. Then, the transaction issuing unit 211 issues the registration transaction for the client certificate of the first user. Specifically, the transaction issuing unit 211 generates the transaction data 122 and sends the transaction data 122 to each of the other authentication systems 120. The other authentication systems 120 are the authentication system 120 of the second organization and the authentication system 120 of the third organization.

In each of the other authentication systems 120, the transaction accepting unit 212 accepts the registration transaction for the client certificate of the first user. Specifically, the transaction accepting unit 212 receives transaction data 122.

Figure 13:
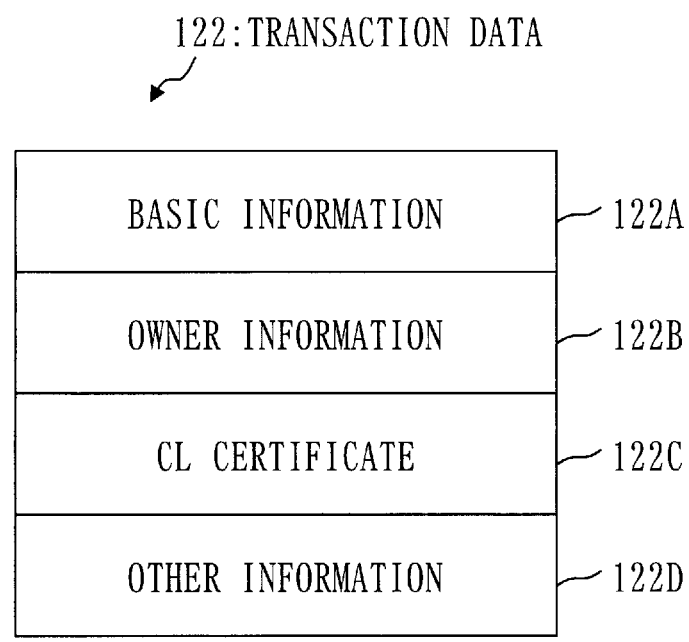
FIG. 13 is a diagram illustrating transaction data 122 in Embodiment 1.

The transaction data 122 will be described with referring to FIG. 13.

The transaction data 122 has basic information 122A, owner information 122B, a client certificate 122C, and other information 122D.

The basic information 122A includes, for example, a transaction ID, issuer information, a blockchain certificate of the issuer, a signature of the issuer, and a timestamp of issue. The issuer information indicates an issuer of the transaction data 122. The issuer is the authentication system 120 of the first organization. The signature of the issuer is generated with using the blockchain private key of the issuer.

The owner information 122B indicates an owner of the client certificate. The owner is the first user.

The client certificate 122C is the client certificate of the first user.

Figure 11:
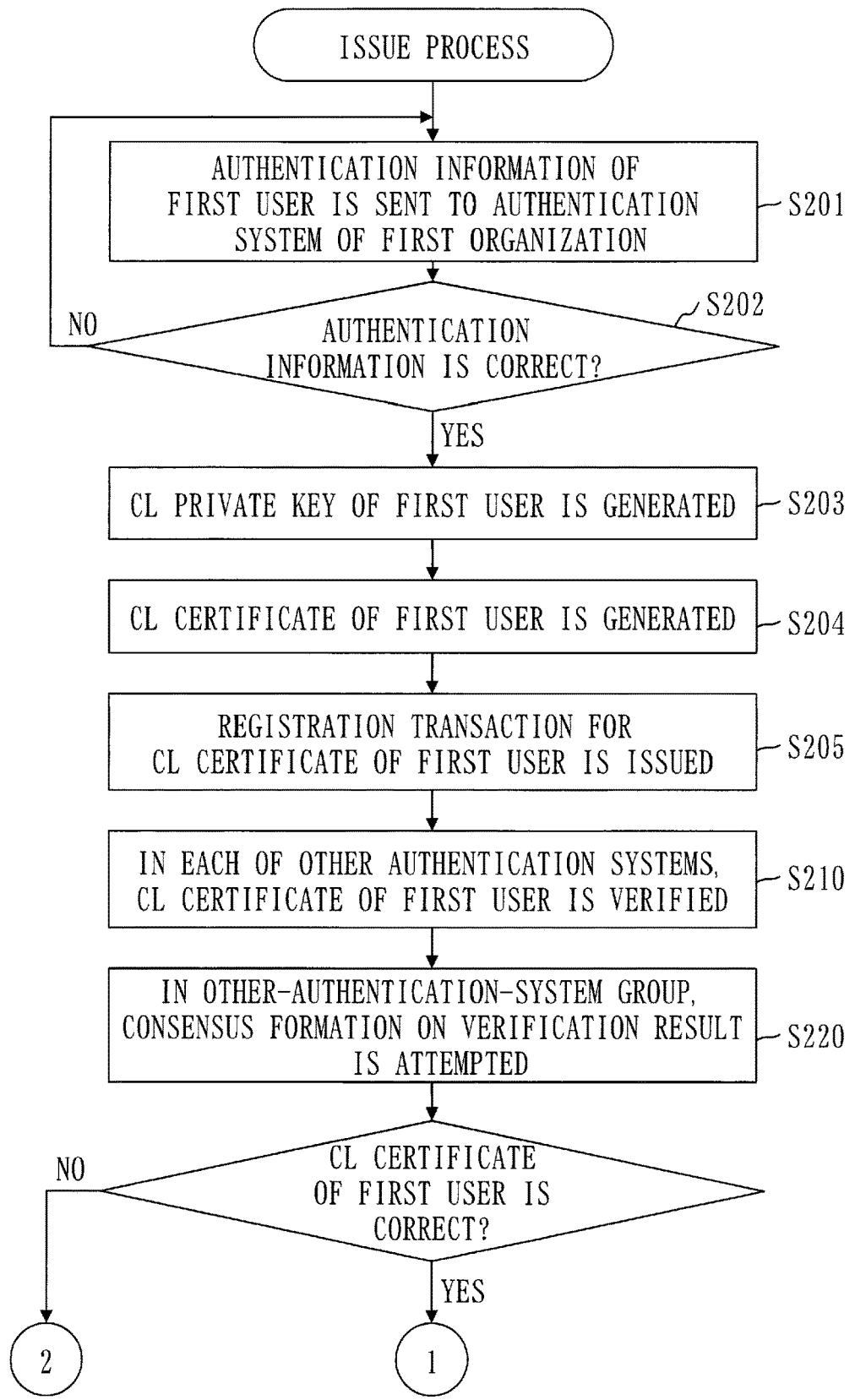
FIG. 11 is a flowchart of an issue process in Embodiment 1.

Back to FIG. 11, the description continues from step S210.

In step S210, the client certificate of the first user is verified. That is, the client certificate 122C included in the transaction data 122 is verified.

A process of step S210 is as follows.

In each of the other authentication systems 120, the certificate verification unit 213 verifies the client certificate of the first user. Specifically, the certificate verification unit 213 acquires the client certificate 122C from the transaction data 122 and verifies the client certificate 122C.

A verification process in step S210 will be described with referring to FIG. 14.

In step S211, the certificate verification unit 213 verifies a format of the transaction data 122.

For example, the certificate verification unit 213 verifies whether the format of the transaction data 122 matches a prescribed format of the registration transaction for the client certificate, whether a term of validity of the client certificate 122C has expired, and so on.

If the format of the transaction data 122 is correct, the processing proceeds to step S212.

If the format of the transaction data 122 is not correct, the certificate verification unit 213 decides that the client certificate 122C is not correct, and the processing ends.

In step S212, the certificate verification unit 213 acquires the issuer information from the basic information 122A of the transaction data 122.

Then, based on the issuer information, the certificate verification unit 213 acquires the certificate authority certificate of the issuer from the blockchain storage unit 290.

In step S213, the certificate verification unit 213 acquires the certificate authority public key from the certificate authority certificate of the issuer.

The certificate verification unit 213 also acquires the client certificate 122C from the transaction data 122.

Then, the certificate verification unit 213 verifies the signature in the client certificate 122C using the certificate authority public key. That is, the certificate verification unit 213 verifies whether the signature of the client certificate 122C is authentic.

In step S214, the certificate verification unit 213 checks a verification result about the signature of the client certificate 122C.

If the signature of the client certificate 122C is correct, the certificate verification unit 213 decides that the client certificate 122C is correct, and the processing ends.

If the signature of the client certificate 122C is not correct, the certificate verification unit 213 decides that the client certificate 122C is not correct, and the processing ends.

Back to FIG. 11, the description continues from step S220.

In step S220, consensus formation on a verification result is attempted by the other-authentication-system group. The other-authentication-system group consists of one or more other authentication systems 120 or more. Specifically, the other-authentication-system group consists of all the authentication systems 120 but the authentication system 120 of the first organization. That is, the other-authentication-system group consists of the authentication system 120 of the second organization and the authentication system 120 of the third organization.

A process of step S220 is as follows.

In the other-authentication-system group, one certificate verification unit 213 or more attempt to form the consensus on the verification result by a consensus formation function.

The consensus formation function is called consensus algorithm.

For example, the verification result is determined by majority decision. That is, if a number of verification results telling that the client certificate is correct is larger than a number of verification results telling that the client certificate is not correct, a consensus that the client certificate is correct is obtained.

The processing branches depending on the result of consensus formation.

If a result is obtained that the client certificate of the first user is correct, the processing proceeds to step S231.

If a result is obtained that the client certificate of the first user is not correct, the processing proceeds to step S241.

In step S231, the client certificate of the first user is registered in the client certificate blockchain.

A process of step S231 is as follows.

In each of the other authentication systems 120, the blockchain management unit 214 registers the client certificate of the first user in the client certificate blockchain. That is, the blockchain management unit 214 stores the client certificate 122C in the blockchain storage unit 290 as part of the client certificate blockchain.

In step S232, the client private key of the first user is saved.

A process of step S232 is as follows.

In each of the other authentication systems 120, the transaction accepting unit 212 sends a registration completion notice to the authentication system 120 of the first organization. The registration completion notice indicates that the client certificate of the first user is registered in the client certificate blockchain.

In the authentication system 120 of the first organization, the transaction issuing unit 211 receives the registration completion notice. The transaction issuing unit 211 sends the registration completion notice, and the authentication unit 311 receives the registration completion notice. Then, the authentication unit 311 saves the client private key of the first user in the client private key storage unit 392.

After step S232, the processing proceeds to step S250.

In step S241, dismissal of the registration transaction is notified to the authentication system 120 of the first organization.

A process of step S241 is as follows.

In each of the other authentication systems 120, the transaction accepting unit 212 sends a dismissal notice to the authentication system 120 of the first organization. The dismissal notice indicates that the registration transaction for the client certificate of the first user is dismissed. That is, the dismissal notice indicates that the client certificate of the first user is not registered in the client certificate blockchain. For example, the dismissal notice includes dismissal reason information. The dismissal reason information is information that distinguishes a dismissal reason. For example, the dismissal reason information indicates the dismissal reason by a code, a character string, or the like.

In the authentication system 120 of the first organization, the transaction issuing unit 211 receives the dismissal notice.

In step S242, the client private key of the first user is deleted.

A process of step S242 is as follows.

In the authentication system 120 of the first organization, the transaction issuing unit 211 sends the dismissal notice, and the authentication unit 311 receives the dismissal notice. Then, the authentication unit 311 deletes the client private key of the first user.

After step S242, the processing proceeds to step S250.

In step S250, an issue result of the client certificate is notified to the user terminal 130.

A process of step S250 is as follows.

In the authentication system 120 of the first organization, the authentication unit 311 sends an issue result notice to the user terminal 130. The issue result notice indicates whether or not a client certificate of the first user is issued.

In the first organization system 110A, the browser unit 132 of the user terminal 130 receives the issue result notice and displays the issue result onto the display. For example, if a client certificate of the first user is not issued, the browser unit 132 displays the dismissal reason onto the display.

Description will now be made on (5) Proxy Certification of User.

When the user accesses the server device 140 of another organization, that is, when the user accesses a service of another organization, the authentication system 120 of the organization that the user belongs to authenticates the user on behalf of the authentication system 120 of another organization.

Figure 15:
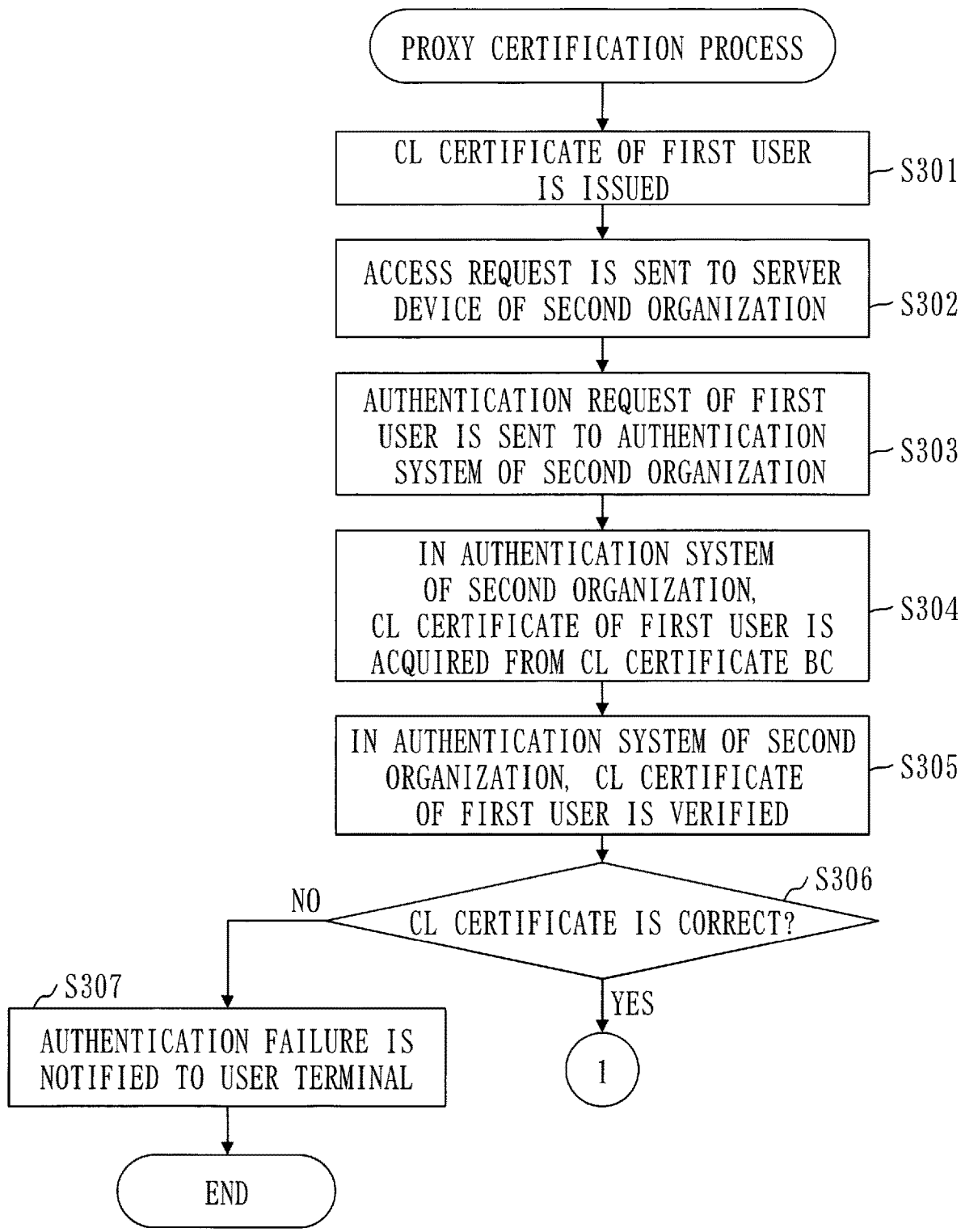
FIG. 15 is a flowchart of a proxy certification process in Embodiment 1.
Figure 16:
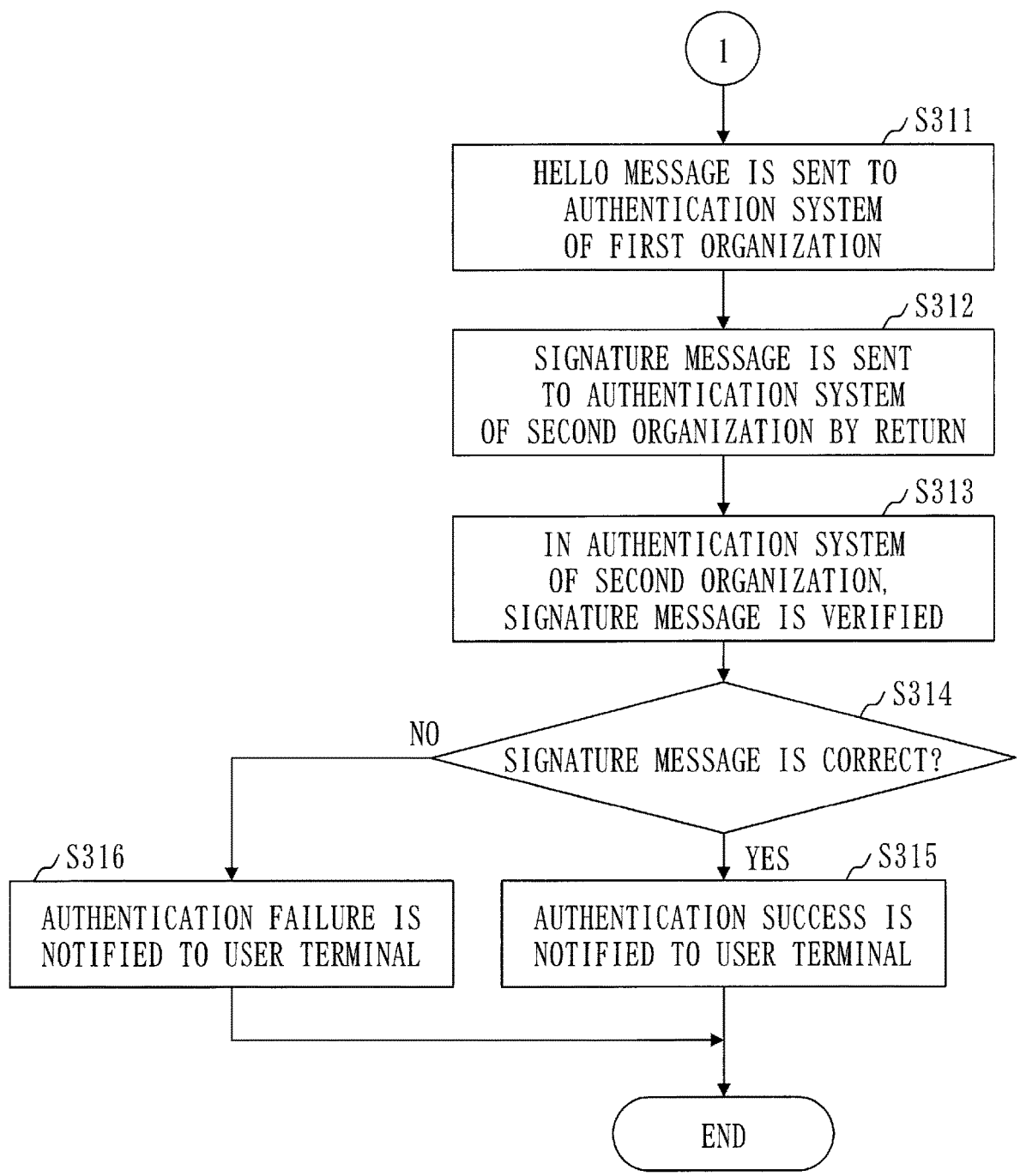
FIG. 16 is a flowchart of the proxy certification process in Embodiment 1.

A proxy certification process will be described with referring to FIGS. 15 and 16 through a case where the first user of the first organization accesses a service of the second organization.

This proxy certification process is a process for (5) Proxy Certification of User.

In step S301, a client certificate of the first user is issued. That is, the client certificate of the first user is registered in the client certificate blockchain.

Figure 12:
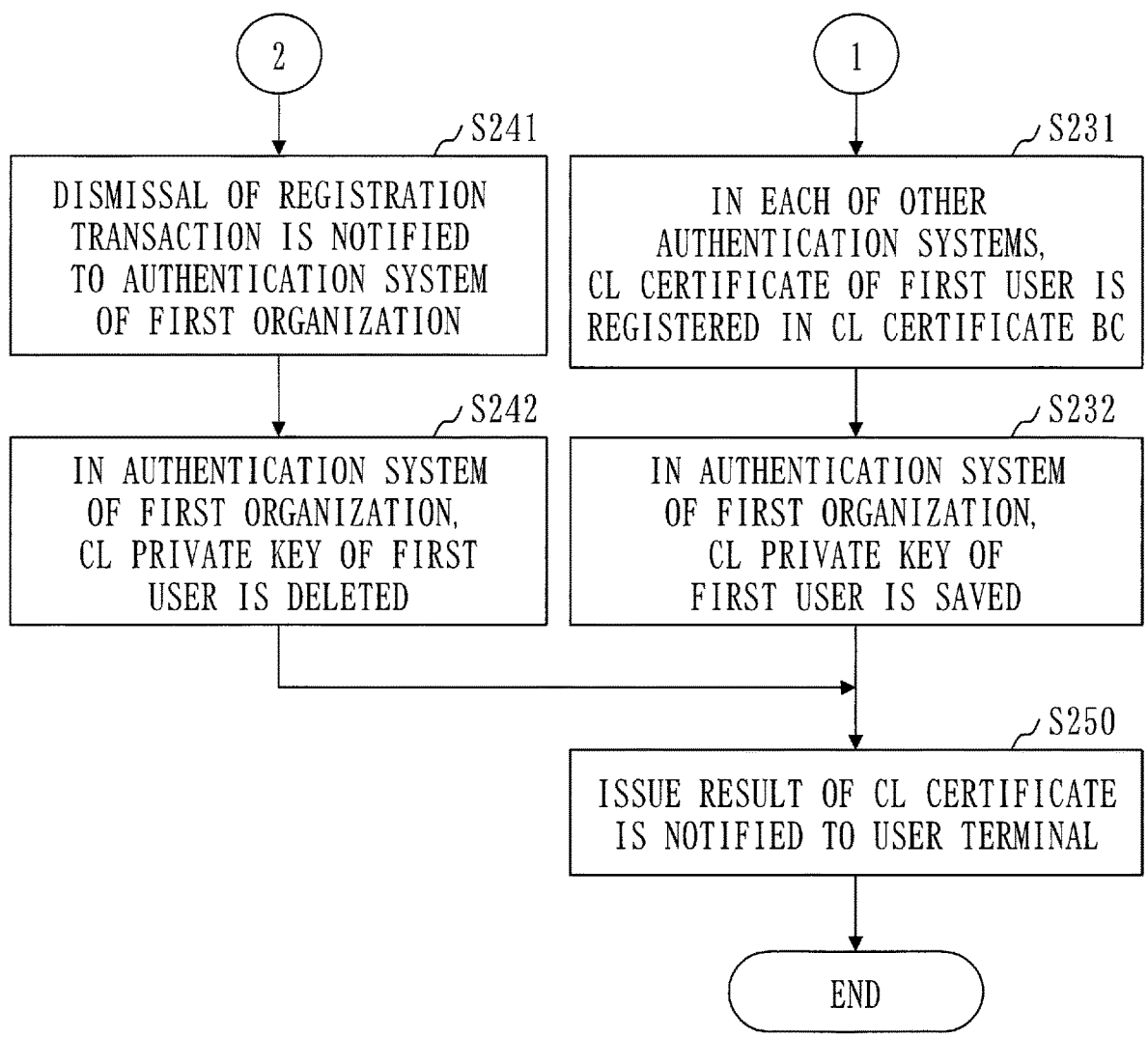
FIG. 12 is a flowchart of the issue process in Embodiment 1.

A process of step S301 corresponds to the issue process described with referring to FIGS. 11 and 12.

In step S302, an access request is sent to the server device 140 of the second organization.

A process of step S302 is as follows.

In the first organization system 110A, the first user inputs to the user terminal 130 the access request for the service of the second organization.

The access information indicates the first organization, the first user, and an access content.

The browser unit 132 of the user terminal 130 sends the access request to the server device 140 of the second organization.

In the second organization system 110B, the server device 140 receives the access request.

In step S303, the authentication request of the first user is sent to the authentication system 120 of the second organization.

A process of step S303 is as follows.

In the second organization system 110B, the server device 140 sends the authentication request of the first user. This authentication request indicates the first organization and the first user.

In the authentication system 120 of the second organization, the authentication unit 311 receives the authentication request of the first user.

In step S304, the client certificate of the first user is acquired from the client certificate blockchain of the second organization.

A process of step S304 is as follows.

In the authentication system 120 of the second organization, the authentication unit 311 sends a first user identifier, and the blockchain management unit 214 receives the first user identifier. Based on the first user identifier, the blockchain management unit 214 acquires the client certificate of the first user from the client certificate blockchain. That is, the blockchain management unit 214 acquires the client certificate of the first user from the blockchain storage unit 290.

In step S305, the client certificate of the first user is verified.

A process of step S305 is as follows.

In the authentication system 120 of the second organization, the certificate verification unit 213 acquires a term of validity from the client certificate of the first user and compares the term of validity with the current time.

If the term of validity is expired, the certificate verification unit 213 decides that the client certificate of the first user is not correct.

If the term of validity is not expired, the certificate verification unit 213 checks whether the client certificate of the first user is registered in the revocation list blockchain. In other words, the certificate verification unit 213 checks whether the client certificate of the first user is stored in the blockchain storage unit 290 as part of the revocation list blockchain. The certificate verification unit 213 carries out decision as follows. First, the certificate verification unit 213 acquires a pair of an issuer and a serial number from the client certificate of the first user. Then, the certificate verification unit 213 checks whether the same pair as the acquired pair is registered in the revocation list blockchain.

If the client certificate of the first user is registered in the revocation list blockchain, the certificate verification unit 213 decides that the client certificate of the first user is not correct.

If the client certificate of the first user is not registered in the revocation list blockchain, the certificate verification unit 213 decides that the client certificate of the first user is correct.

In step S306, a verification result about the client certificate of the first user is checked.

A process of step S306 is as follows.

In the authentication system 120 of the second organization, the certificate verification unit 213 sends a verification result notice, and the authentication unit 311 receives the verification result notice. The verification result notice indicates whether or not the client certificate of the first user is correct. Based on the verification result notice, the authentication unit 311 checks the verification result about the client certificate of the first user.

If the client certificate of the first user is correct, the processing proceeds to step S311.

If the client certificate of the first user is not correct, the processing proceeds to step S307.

In step S307, an authentication failure is notified to the user terminal 130.

A process of step S307 is as follows.

In the authentication system 120 of the second organization, the authentication unit 311 sends an authentication failure notice.

In the second organization system 110B, the server device 140 receives the authentication failure notice and sends the authentication failure notice. The user terminal 130 receives the authentication failure notice and displays the authentication failure onto the display.

After step S307, the processing ends. In this case, the first user cannot access the service of the second organization.

In step S311, a hello message is sent to the authentication system 120 of the first organization.

A process of step S311 is as follows.

In the authentication system 120 of the second organization, the authentication unit 311 generates the hello message and sends the hello message and the first user identifier to the authentication system 120 of the first organization. The hello message includes a random number.

In the authentication system 120 of the first organization, the proxy certification unit 312 receives the hello message and the first user identifier.

In step S312, a signature message is sent to the authentication system 120 of the second organization by return.

A process of step S312 is as follows.

In the authentication system 120 of the first organization, the proxy certification unit 312 acquires the client private key of the first user from the client private key storage unit 392, based on the first user identifier. The proxy certification unit 312 encrypts the hello message using the client private key of the first user. The encrypted hello message is the signature message. The proxy certification unit 312 sends the signature message to the authentication system 120 of the second organization.

In the authentication system 120 of the second organization, the authentication unit 311 receives the signature message.

In step S313, the signature message is verified.

A process of step S313 is as follows.

In the authentication system 120 of the second organization, the authentication unit 311 acquires a client public key of the first user from the client certificate of the first user. The authentication unit 311 decrypts the signature message using the client public key of the first user. Then, the authentication unit 311 checks whether the decrypted signature message matches the hello message.

If the decrypted signature message matches the hello message, the signature message is correct.

In step S314, a verification result of the signature message is checked.

A process of step S314 is as follows.

In the authentication system 120 of the second organization, the authentication unit 311 checks the verification result of the signature message.

If the signature message is correct, the authentication unit 311 decides that the first user is a legitimate user, and the processing proceeds to step S315.

If the signature message is not correct, the authentication unit 311 decides that the first user is an illegitimate user, and the processing proceeds to step S316.

In step S315, an authentication success is notified to the user terminal 130.

A process of step S315 is as follows.

In the authentication system 120 of the second organization, the authentication unit 311 sends an authentication success notice.

In the second organization system 110B, the server device 140 receives the authentication success notice and sends the authentication success notice. The user terminal 130 receives the authentication success notice and displays the authentication success onto the display.

After step S315, the processing ends. In this case, the first user can access the service of the second organization.

In step S316, an authentication failure is notified to the user terminal 130.

A process of step S316 is as follows.

In the authentication system 120 of the second organization, the authentication unit 311 sends an authentication failure notice.

In the second organization system 110B, the server device 140 receives the authentication failure notice and sends the authentication failure notice. The user terminal 130 receives the authentication failure notice and displays the authentication failure onto the display.

After step S316, the processing ends. In this case, the first user cannot access the service of the second organization.

Description will now be made on (6) Logout of User.

In each of the other authentication systems 120, a client certificate of the user is registered in the revocation list blockchain.

A logout process will be described with referring to FIG. 17 through a case where the first user of the first organization logs out.

This logout process is a process for (6) Logout of User.

In step S401, a logout request is sent to the authentication system 120 of the first organization.

A process of step S401 is as follows.

In the first organization system 110A, the first user inputs the logout request to the user terminal 130.

The logout request indicates the first organization and the first user.

The browser unit 132 of the user terminal 130 sends the logout request to the authentication system 120 of the first organization.

In the authentication system 120 of the first organization, the logout accepting unit 313 receives the logout request.

In step S402, a revocation transaction for the client certificate of the first user is issued.

The revocation transaction for the client certificate is a transaction for registering the client certificate in the revocation list blockchain.

A process of step S402 is as follows.

In the authentication system 120 of the first organization, the logout accepting unit 313 sends the first user identifier to the transaction issuing unit 211. Based on the first user identifier, the transaction issuing unit 211 acquires the client certificate of the first user from the client certificate blockchain of the first organization. Then, the transaction issuing unit 211 issues the revocation transaction for the client certificate of the first user. Specifically, the transaction issuing unit 211 generates transaction data 123 and sends the transaction data 123 to each of the other authentication systems 120. The other authentication systems 120 are the authentication system 120 of the second organization and the authentication system 120 of the third organization.

In each of the other authentication systems 120, the transaction accepting unit 212 receives the transaction data 123.

Figure 18:
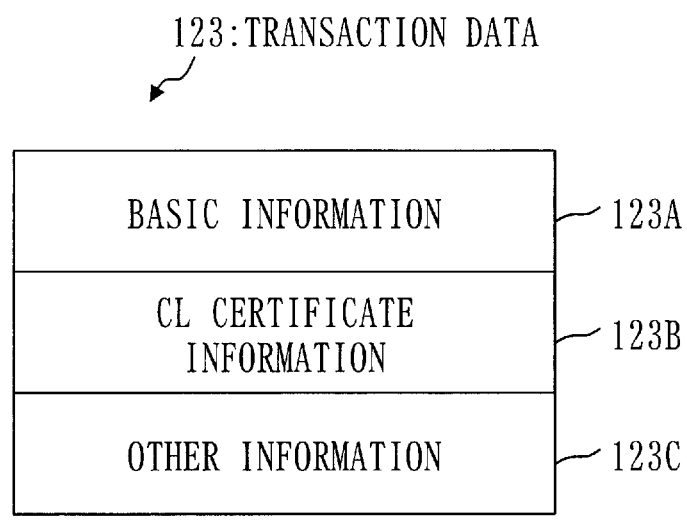
FIG. 18 is a diagram illustrating transaction data 123 in Embodiment 1.

The transaction data 123 will be described with referring to FIG. 18.

The transaction data 123 has basic information 123A, client certificate information 123B, and other information 123C.

The basic information 123A includes, for example, a transaction ID, issuer information, a blockchain certificate of the issuer, a signature of the issuer, and a timestamp of issue. The issuer information indicates the issuer of the transaction data 123. The issuer is the authentication system 120 of the first organization. The signature of the issuer is generated with using the blockchain private key of the issuer.

The client certificate information 123B identifies the client certificate of the first user. For example, the client certificate information 123B indicates an issuer ID and serial number of the client certificate of the first user.

Figure 17:
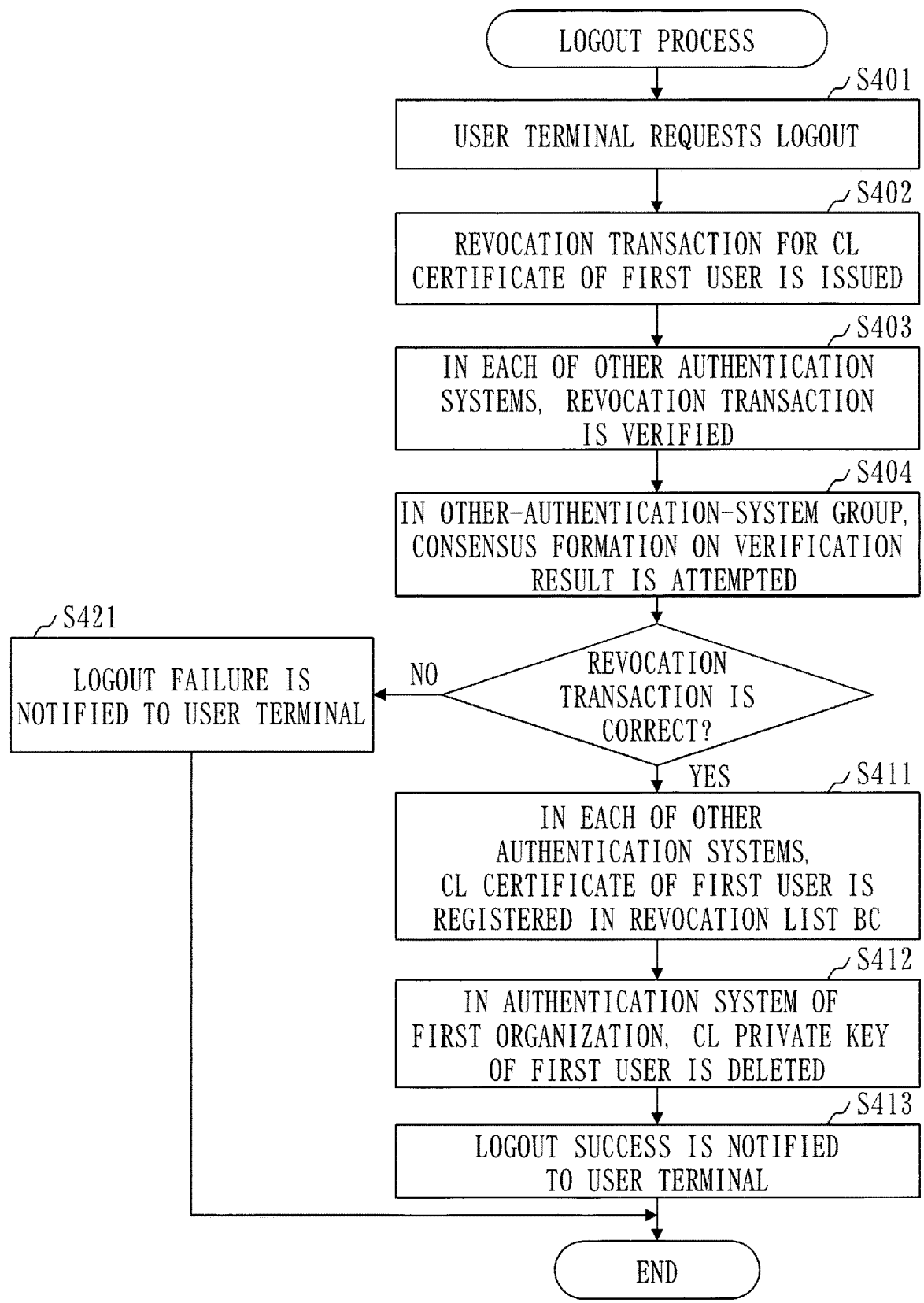
FIG. 17 is a flowchart of a logout process in Embodiment 1.

Back to FIG. 17, the description continues from step S403.

In step S403, the revocation transaction for the client certificate of the first user is verified.

A process of step S403 is as follows.

In each of the other authentication systems 120, the transaction verification unit 215 verifies the revocation transaction for the client certificate of the first user. Specifically, the transaction verification unit 215 verifies the transaction data 123 as follows.

The transaction verification unit 215 checks whether a format of the transaction data 123 is correct. If the format of the transaction data 123 matches a prescribed format of the revocation transaction, the format of the transaction data 123 is correct.

If the format of the transaction data 123 is correct, the transaction verification unit 215 acquires the blockchain public key from the blockchain certificate of the issuer in the transaction data 123. Then, using the blockchain public key, the transaction verification unit 215 verifies a signature of the issuer in the transaction data 123.

If the signature of the issuer is correct, the transaction verification unit 215 acquires issuer information and the client certificate information 123B from the transaction data 123. Then, the transaction verification unit 215 checks whether the issuer of the transaction data 123 matches the issuer of the client certificate of the first user. If the issuer of the transaction data 123 matches the issuer of the client certificate of the first user, the issuer information is correct.

If the issuer information is correct, the transaction verification unit 215 decides that the revocation transaction is correct.

If the format of the transaction data 123 is not correct, the transaction verification unit 215 decides that the revocation transaction is not correct.

If the signature of the issuer is not correct, the transaction verification unit 215 decides that the revocation transaction is not correct.

If the issuer information is not correct, the transaction verification unit 215 decides that the revocation transaction is not correct.

In step S404, consensus formation on a verification result is attempted by the other-authentication-system group. The other-authentication-system group consists of one of the other authentication systems 120 or more. Specifically, the other-authentication-system group consists of all the authentication systems 120 but the authentication system 120 of the first organization. That is, the other-authentication-system group consists of the authentication system 120 of the second organization and the authentication system 120 of the third organization.

A process of step S404 is as follows.

In the other-authentication-system group, one transaction verification unit 215 or more attempt to form the consensus on the verification result by a consensus formation function.

The consensus formation function is called consensus algorithm.

For example, the verification result is determined by majority decision. That is, if a number of verification results telling that the revocation transaction is correct is larger than a number of verification results telling that the revocation transaction is not correct, a consensus that the revocation transaction is correct is obtained.

The processing branches depending on the result of consensus formation.

If a result is obtained that the revocation transaction is correct, the processing proceeds to step S411.

If a result is obtained that the revocation transaction is not correct, the processing proceeds to step S421.

In step S411, the client certificate of the first user is registered in the revocation list blockchain.

A process of step S411 is as follows.

In each of the other authentication systems 120, the blockchain management unit 214 registers the client certificate of the first user in the revocation list blockchain. That is, the blockchain management unit 214 stores information of the client certificate of the first user in the blockchain storage unit 290 as part of the revocation list blockchain.

In step S412, the client private key of the first user is deleted.

A process of step S412 is as follows.

In at least any one of the other authentication systems 120, the transaction accepting unit 212 sends the result of consensus formation to the authentication system 120 of the first organization.

In the authentication system 120 of the first organization, the transaction issuing unit 211 receives the result of consensus formation. The transaction issuing unit 211 sends the result of consensus formation, and the logout accepting unit 313 receives the result of consensus formation. Then, the logout accepting unit 313 deletes the client private key of the first user from the client private key storage unit 392.

In step S413, a logout success is notified to the user terminal 130.

A process of step S413 is as follows.

In the authentication system 120 of the first organization, the logout accepting unit 313 sends a logout success notice.

In the first organization system 110A, the user terminal 130 receives the logout success notice and displays the logout success onto the display.

After step S413, the processing ends. In this case, user logout is completed.

In step S421, a logout failure is notified to the user terminal 130.

A process of step S421 is as follows.

In at least any one of the other authentication systems 120, the transaction accepting unit 212 sends the result of consensus formation to the authentication system 120 of the first organization.

In the authentication system 120 of the first organization, the transaction issuing unit 211 receives the result of consensus formation. The transaction issuing unit 211 sends the result of consensus formation, and the logout accepting unit 313 receives the result of consensus formation. Then, the logout accepting unit 313 sends a logout failure notice.

In the first organization system 110A, the user terminal 130 receives the logout failure notice and displays the logout failure onto the display.

After step S421, the processing ends. In this case, user logout is not completed. In order to complete user logout, the logout process must be executed again.

Effect of Embodiment 1

The user is authenticated necessarily by the same authentication device 300. Specifically, the user is authenticated by the authentication device 300 of the organization that the user belongs to. Therefore, even in a case where the user uses the individual user terminals 130 of the user terminal group 130G, the user can be authenticated with using the authentication information stored in the authentication device 300.

The authentication systems 120 of the individual organizations can share the client certificate by federating with each other using a blockchain.

The proxy certification unit 312 performs proxy certification. Hence, the user can access the service of each organization by inputting authentication information only once.

Since the blockchain is utilized, the authentication information can be securely shared by the plurality of authentication systems 120 of the plurality of organizations. Then, the authentication federation system 100 can be operated by an organization that the user belongs to and an organization that provides the service.

The individual organizations have the same authentication systems 120. Therefore, the operation of the blockchain can be adjusted such that the burden of the organization and the responsibility of the organization are of the same degree among the individual organizations. In other words, in the authentication federation system 100, the individual organizations can share the burden and responsibility impartially.

Embodiment 2

Figure 19:
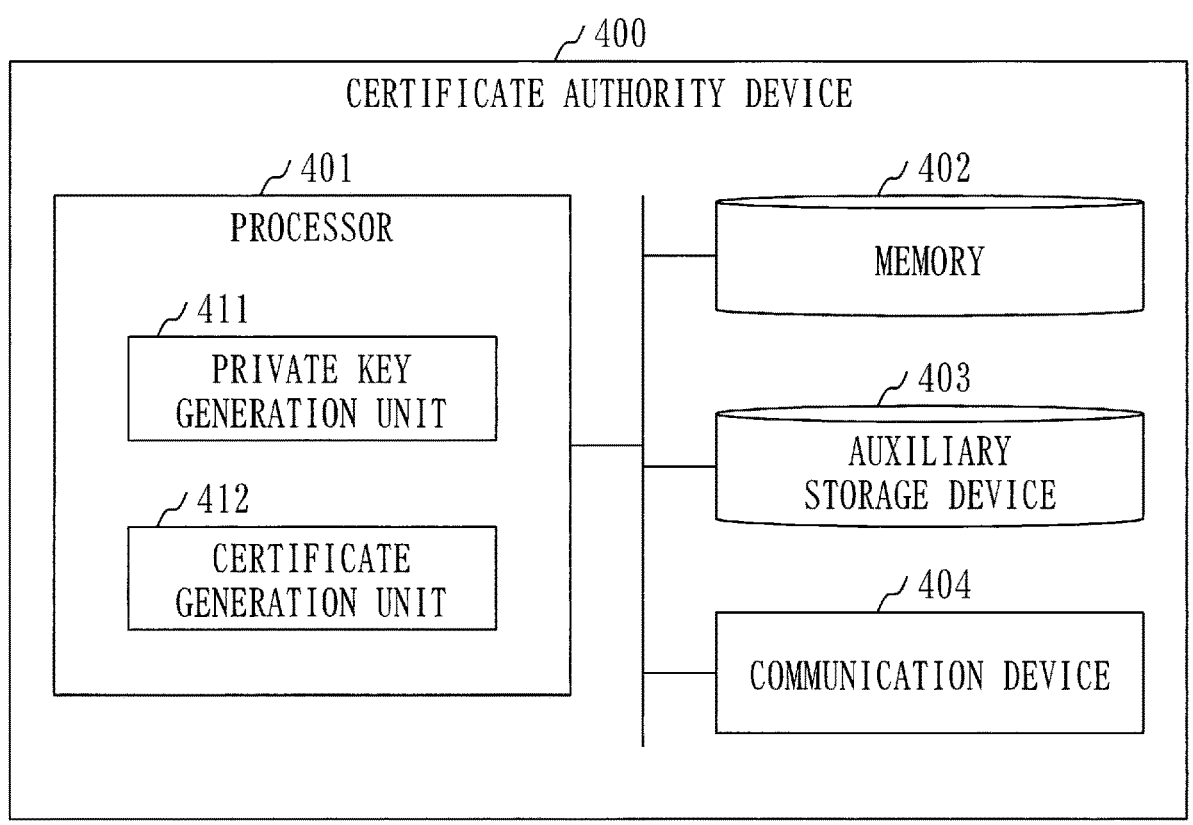
FIG. 19 is a configuration diagram of a certificate authority device 400 in Embodiment 2.
Figure 20:
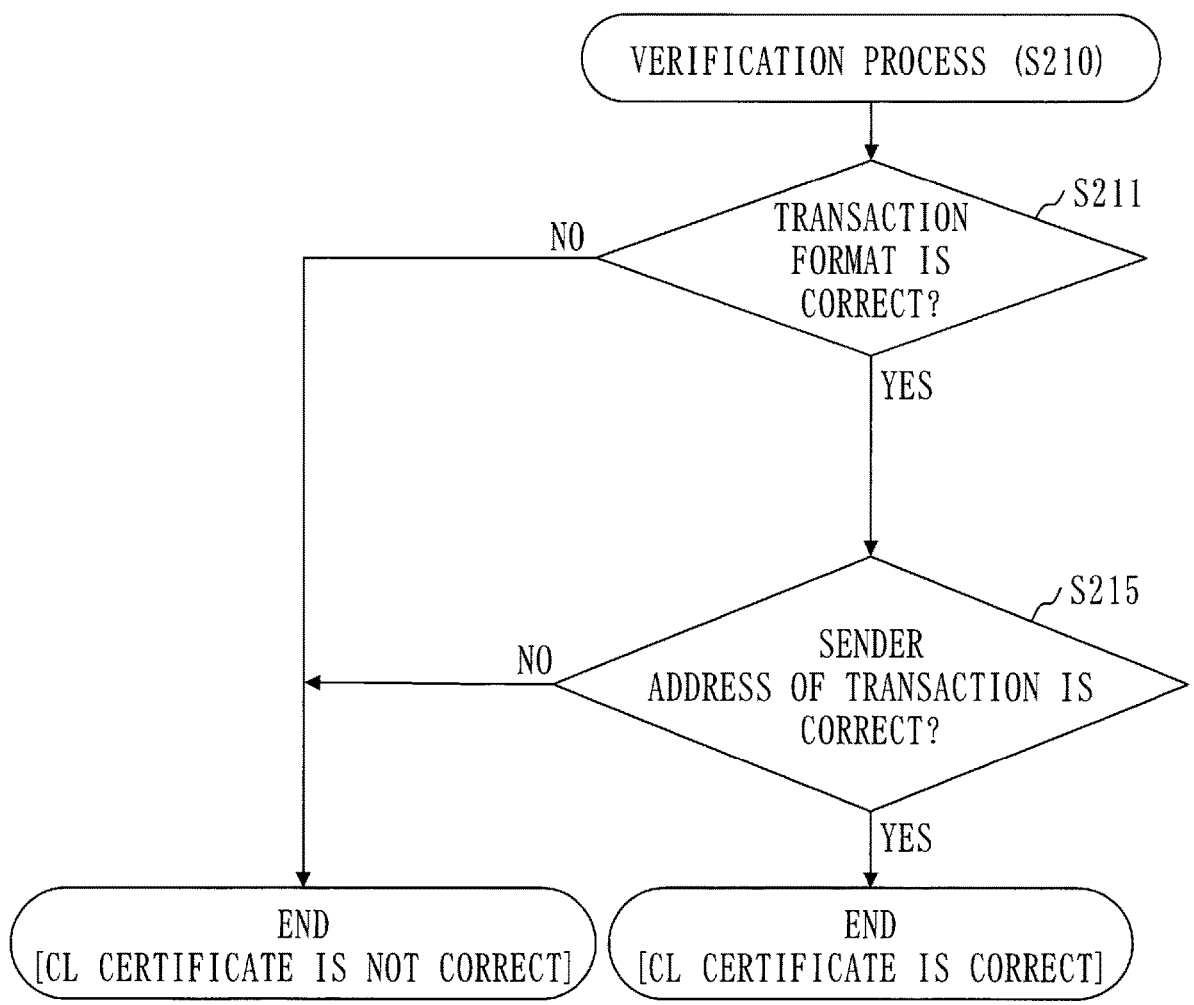
FIG. 20 is a flowchart of a verification process (S210) in Embodiment 2.

A mode that does not utilize a certificate authority certificate blockchain will be described with referring to FIGS. 19 and 20 mainly regarding a difference from Embodiment 1.

* Description of Configuration *

A configuration of an authentication federation system 100 is the same as the corresponding configuration in Embodiment 1 (see FIG. 1).

Figure 2:
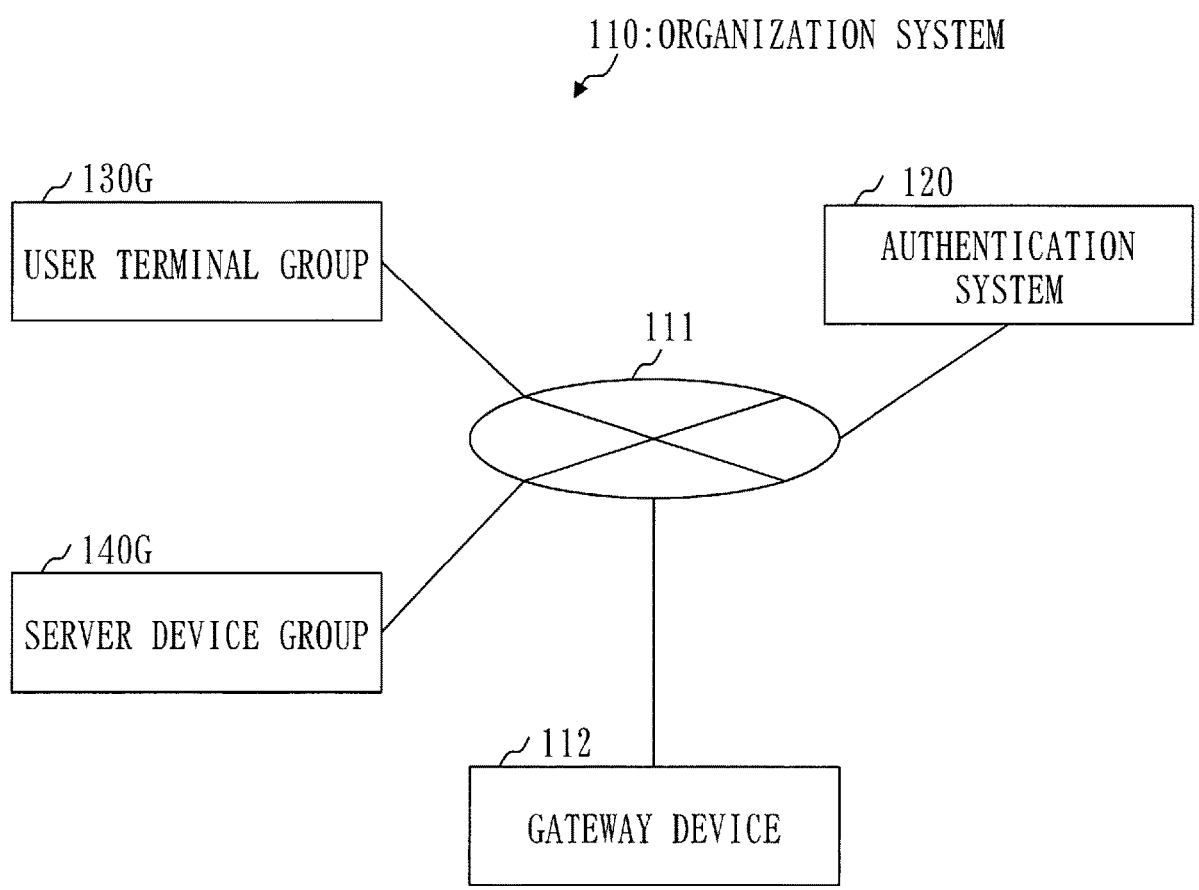
FIG. 2 is a configuration diagram of an organization system 110 in Embodiment 1.

A configuration of an organization system 110 is the same as the corresponding configuration in Embodiment 1 (see FIG. 2).

Figure 3:
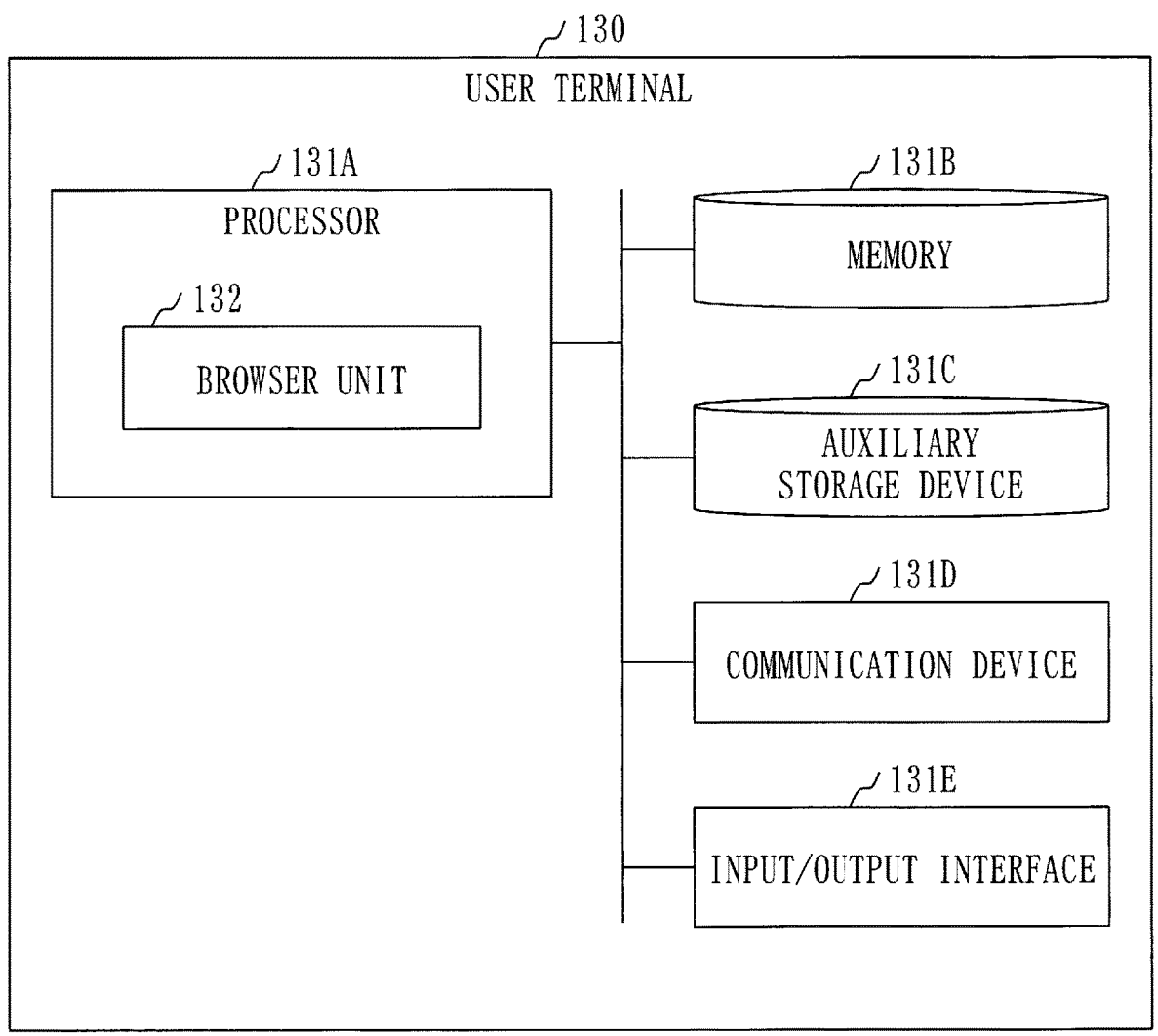
FIG. 3 is a configuration diagram of a user terminal 130 in Embodiment 1.

A configuration of a user terminal 130 is the same as the corresponding configuration in the Embodiment 1 (see FIG. 3).

Figure 4:
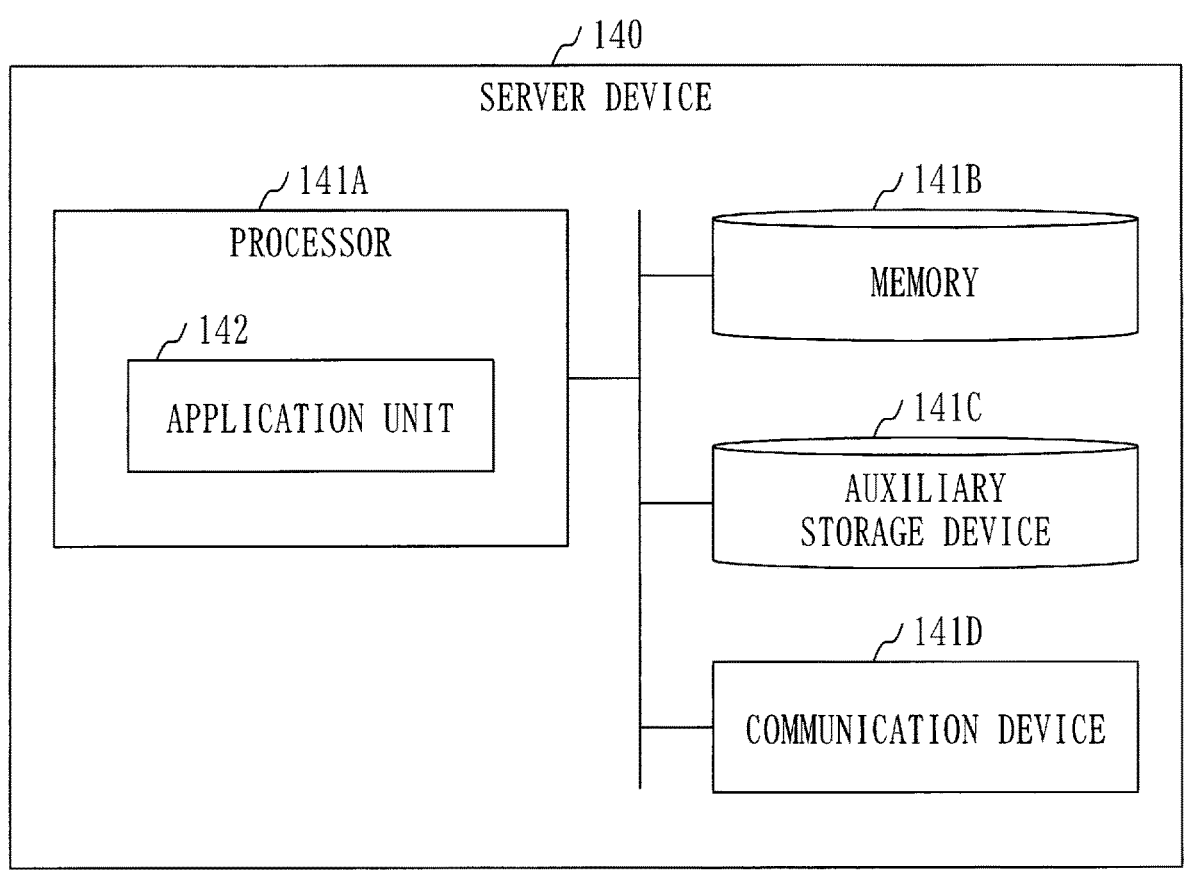
FIG. 4 is a configuration diagram of a server device 140 in Embodiment 1.

A configuration of a server device 140 is the same as the corresponding configuration in Embodiment 1 (see FIG. 4).

Figure 5:
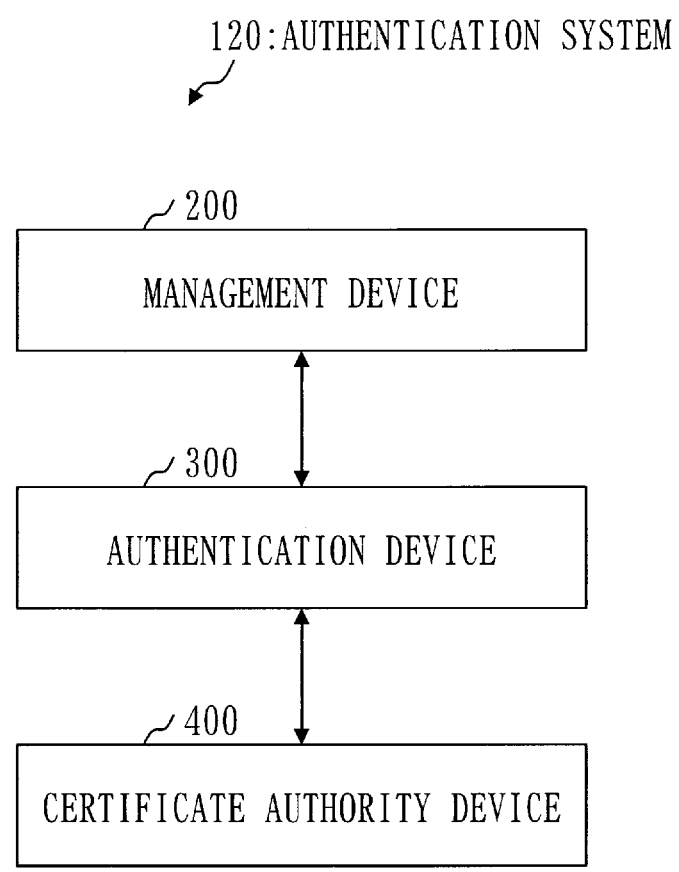
FIG. 5 is a configuration diagram of an authentication system 120 in Embodiment 1.

A configuration of an authentication system 120 is the same as the corresponding configuration in Embodiment 1 (see FIG. 5).

Figure 6:
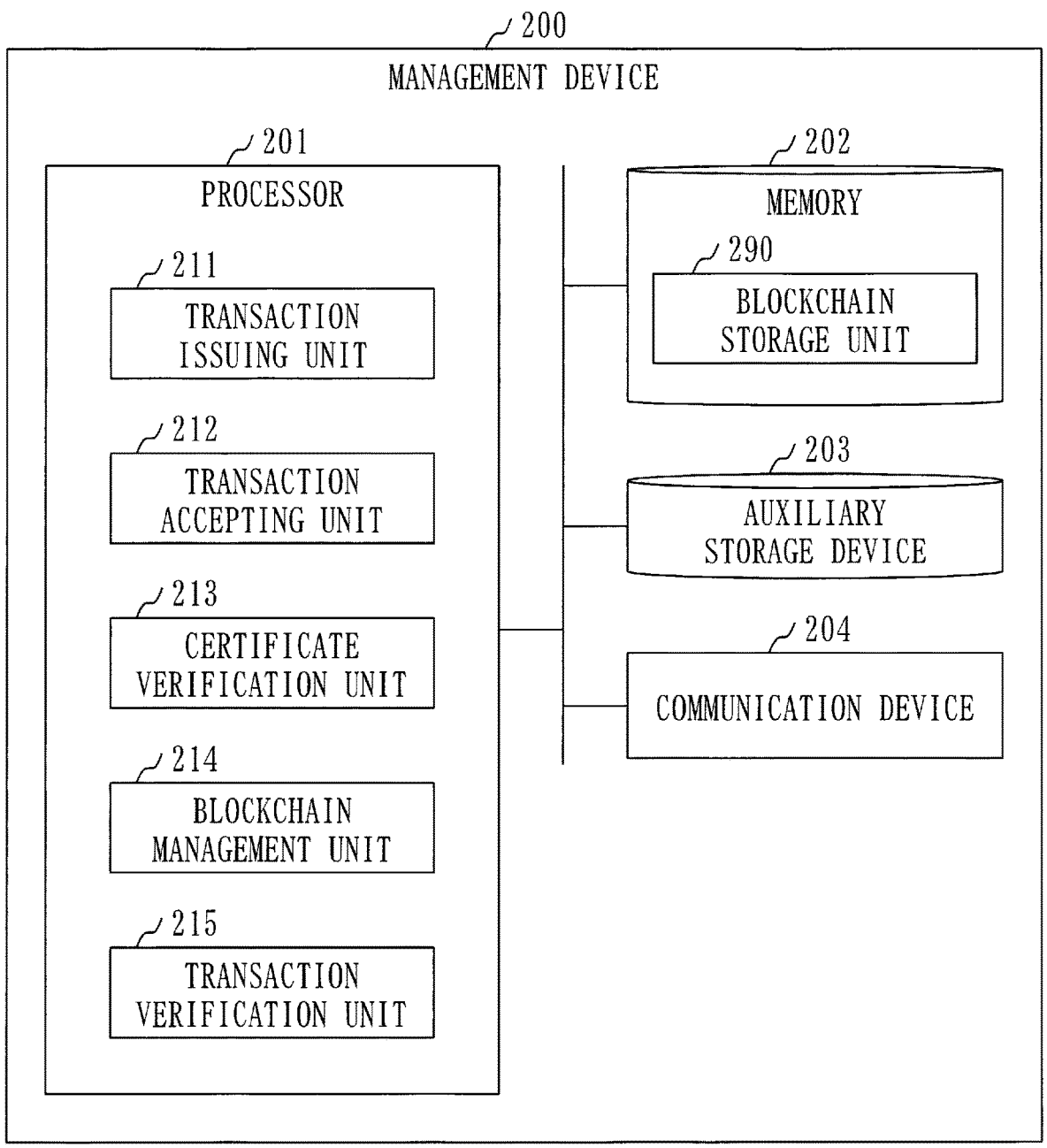
FIG. 6 is a configuration diagram of a management device 200 in Embodiment 1.

A configuration of a management device 200 is the same as the corresponding configuration in Embodiment 1 (see FIG. 6).

Figure 7:
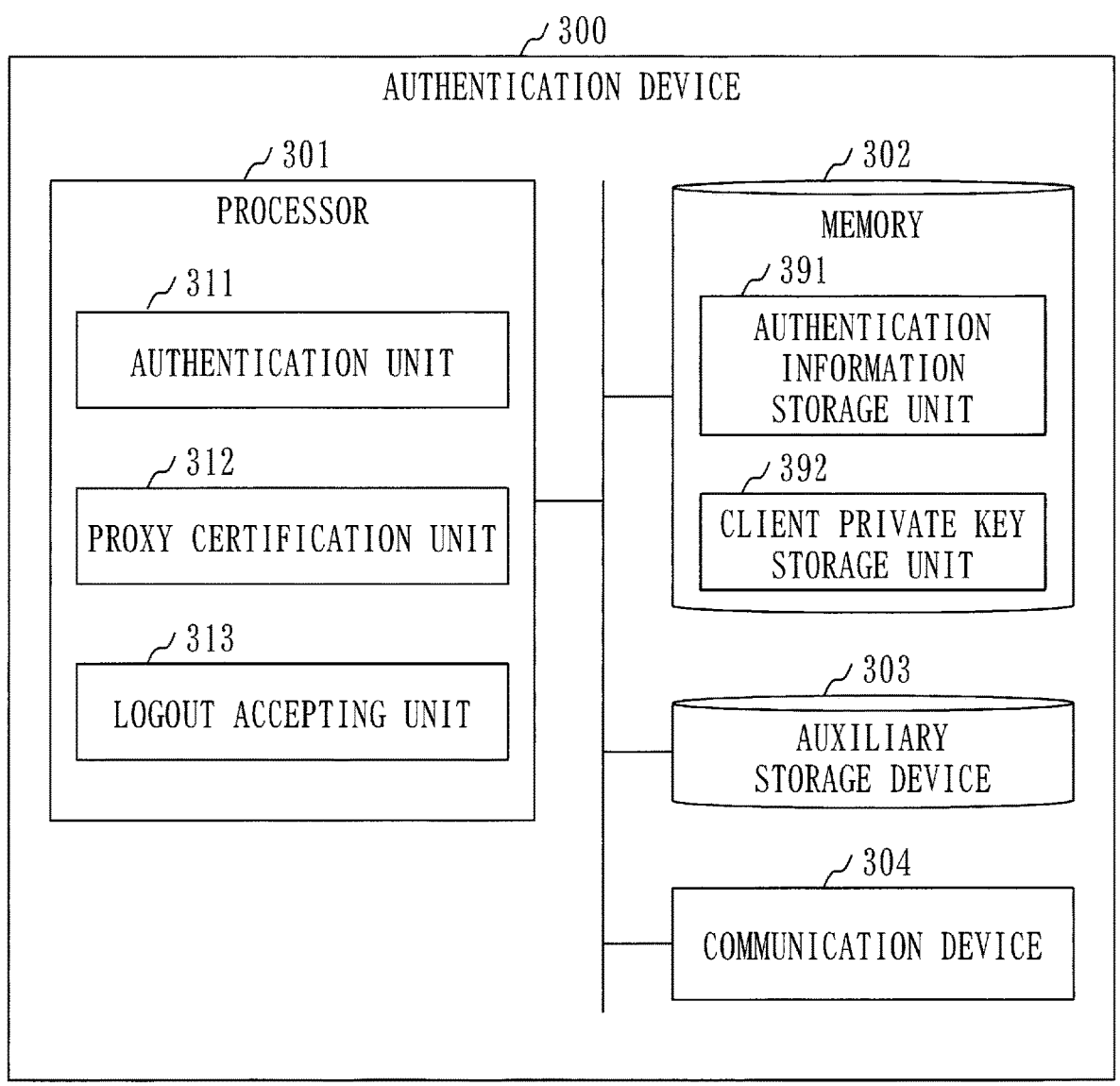
FIG. 7 is a configuration diagram of an authentication device 300 in Embodiment 1.

A configuration of an authentication device 300 is the same as the corresponding configuration in Embodiment 1 (see FIG. 7).

A configuration of a certificate authority device 400 will be described with referring to FIG. 19.

In the certificate authority device 400, a memory 402 does not have a certificate authority private key storage unit 490.

Figure 8:
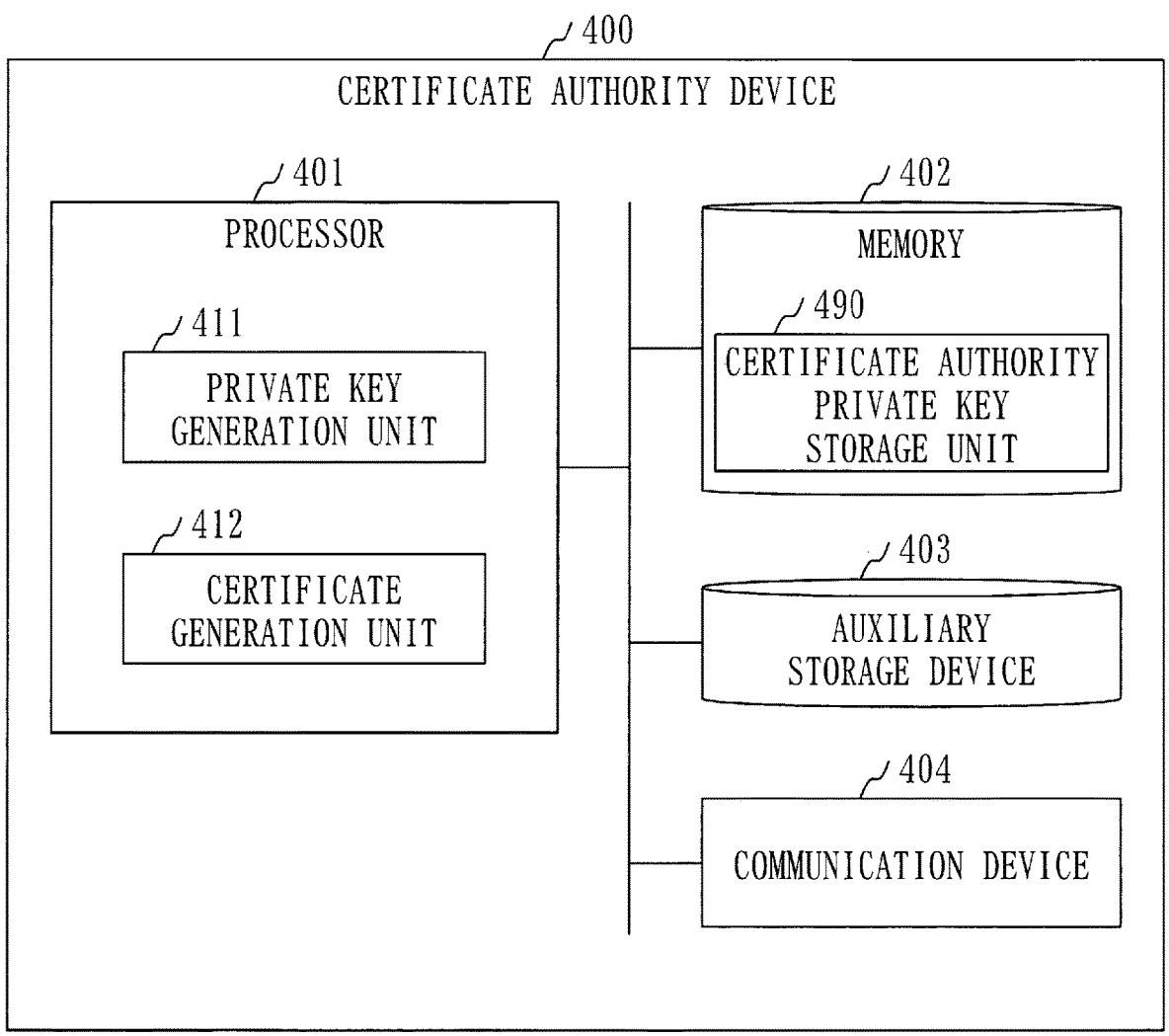
FIG. 8 is a configuration diagram of a certificate authority device 400 in Embodiment 1.

Except for this, the configuration of the certificate authority device 400 is the same as the corresponding configuration in Embodiment 1 (see FIG. 8).

* Description of Operations *

In Embodiment 2, a pair of a certificate authority private key and a certificate authority certificate is unnecessary. Namely, a certificate authority certificate blockchain is unnecessary. Hence, a registration process (see FIG. 9) is unnecessary.

In Embodiment 2, an address list is used in place of a certificate authority certificate blockchain.

The address list indicates addresses of individual authentication systems 120. For example, the address list indicates IP addresses of individual management devices 200. Note that IP stands for Internet Protocol.

The address list is stored in each authentication system 120. Specifically, the address list is stored in each management device 200.

How the address list is used will be described below.

An issue process will be described with referring to FIGS. 11 and 12.

Step S201 to step S203 are as described in Embodiment 1.

In step S204, a client certificate of a first user is generated. Note that the client certificate of the first user is generated without using a certificate authority private key of a first organization. In other words, the client certificate of the first user does not include a signature generated with using the certificate authority private key of the first organization.

Step S205 is as described in Embodiment 1.

In step S210, the client certificate of the first user is verified.

A verification process (S210) will be described with referring to FIG. 20.

Figure 14:
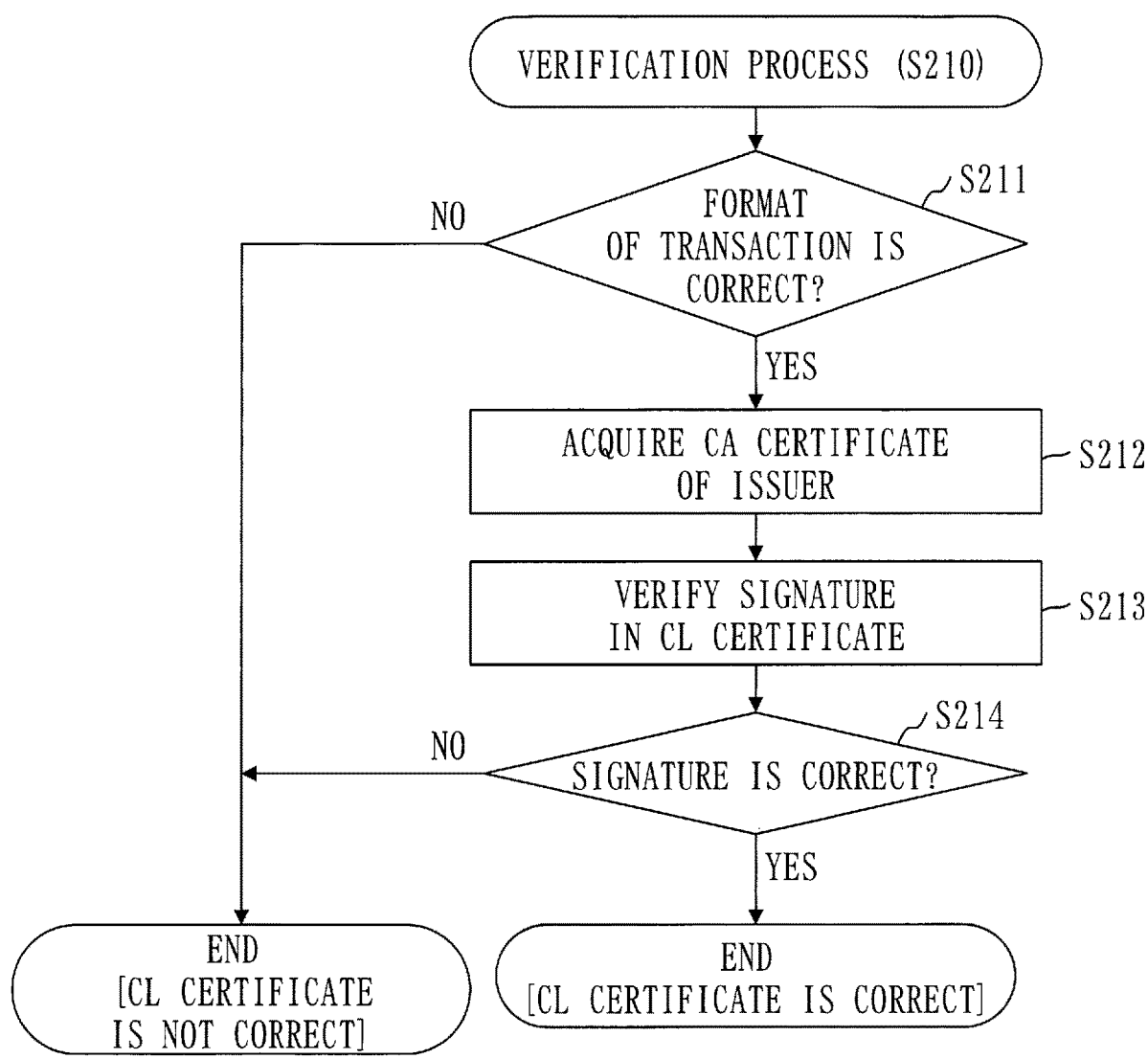
FIG. 14 is a flowchart of a verification process (S210) in Embodiment 1.

Step S211 is as described in Embodiment 1 (see FIG. 14).

If a format of transaction data 122 is correct, the processing proceeds to step S215.

In step S215, a certificate verification unit 213 verifies a sender address of the transaction data 122. The sender address of the transaction data 122 signifies an address of an issuer of a registration transaction for the client certificate.

Specifically, the certificate verification unit 213 checks whether the sender address of the transaction data 122 is registered in the address list. If the sender address of the transaction data 122 is registered in the address list, the sender address of the transaction data 122 is correct.

If the sender address of the transaction data 122 is correct, the certificate verification unit 213 decides that a client certificate 122C is correct, and the processing ends.

If the sender address of the transaction data 122 is not correct, the certificate verification unit 213 decides that the client certificate 122C is not correct, and the processing ends.

Effect of Embodiment 2

The authentication federation system 100 having the same functions as those of Embodiment 1 can be realized without using a certificate authority certificate blockchain.

Embodiment 3

Figure 21:
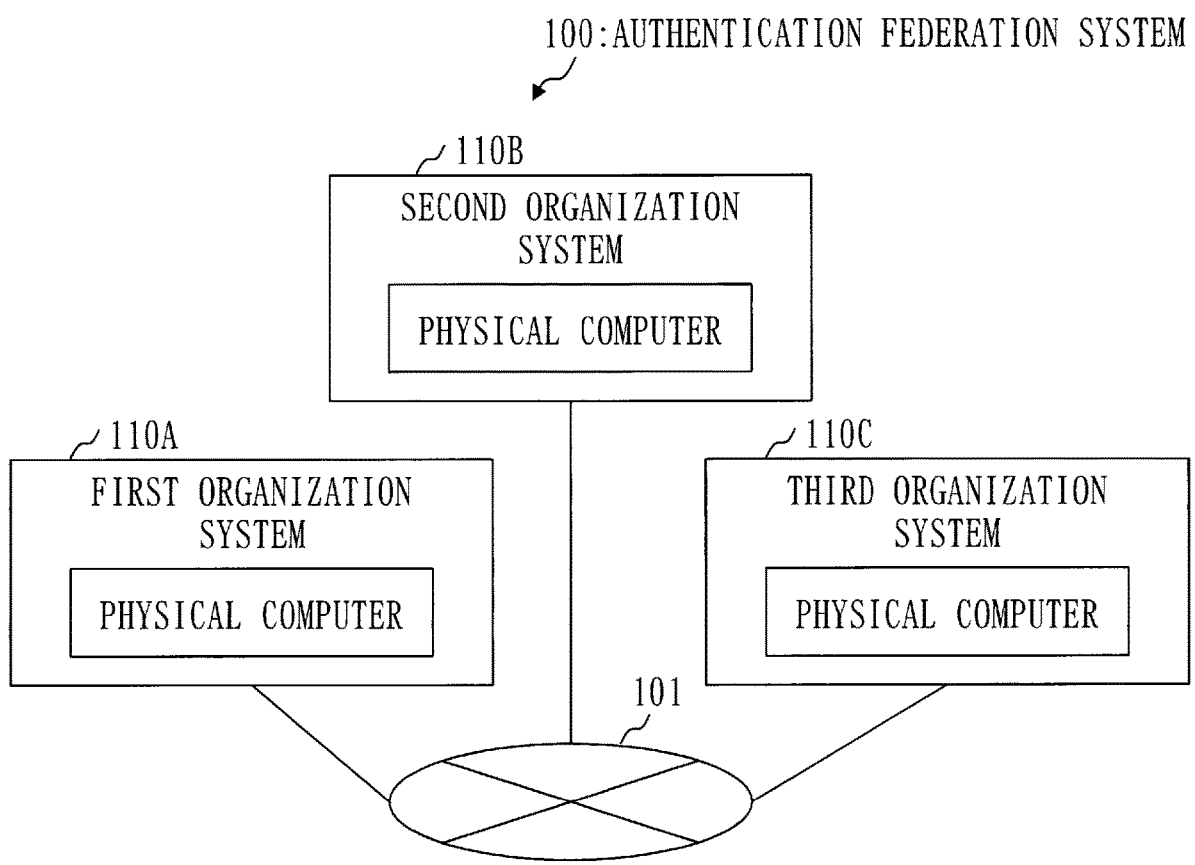
FIG. 21 is a configuration diagram of an authentication federation system 100 in Embodiment 3.

A mode that utilizes virtualization technology will be described with referring to FIG. 21 mainly regarding differences from Embodiments 1 and 2.

* Description of Configuration *

A configuration of an authentication federation system 100 will be described with referring to FIG. 21.

The configuration of the authentication federation system 100 is the same as the corresponding configuration in Embodiment 1 (see FIG. 1).

Note that each authentication federation system 100 is provided with one physical computer or more.

The physical computer implements at least one of a user terminal 130, a server device 140, a management device 200, an authentication device 300, and a certificate authority device 400, by the virtualization technology. A specific virtualization technology is a virtual machine or container technology.

For example, in each organization system 110, the management device 200, the authentication device 300, and the certificate authority device 400 are implemented in one physical computer by the virtualization technology. In this case, in each organization system 110, an authentication system 120 is implemented in one physical computer by the virtualization technology.

* Description of Operations *

Operations of the authentication federation system 100 are the same as the operations in Embodiment 1 or 2.

Effect of Embodiment 3

The authentication federation system 100 having the same functions as those of Embodiment 1 can be realized with a small number of physical computers.

* Supplement to Embodiments *

Figure 22:
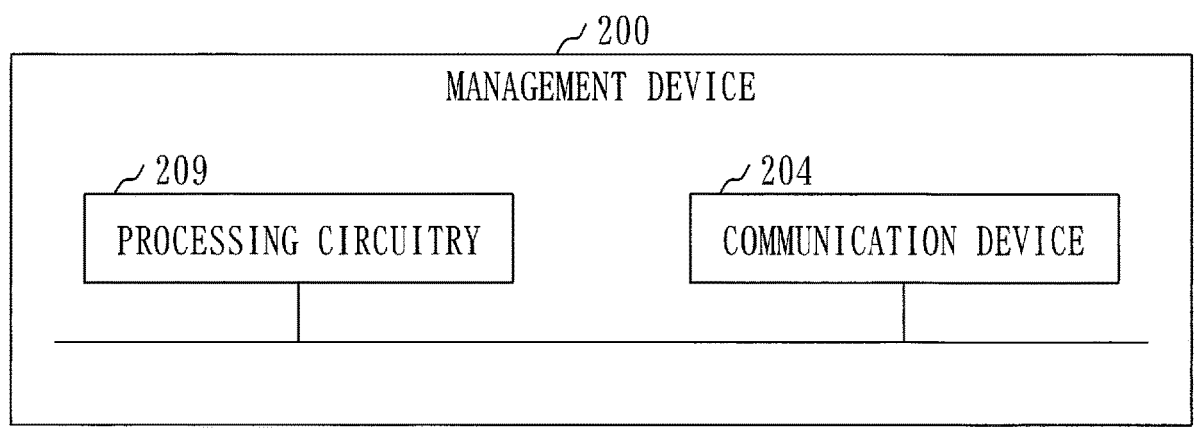
FIG. 22 is a hardware configuration diagram of the management device 200 in each embodiment.

A hardware configuration of the management device 200 will be described with referring to FIG. 22.

The management device 200 is provided with processing circuitry 209.

The processing circuitry 209 is hardware that implements the transaction issuing unit 211, the transaction accepting unit 212, the certificate verification unit 213, the blockchain management unit 214, the transaction verification unit 215, and the blockchain storage unit 290.

The processing circuitry 209 may be dedicated hardware, or may be the processor 201 that executes the program stored in the memory 202.

If the processing circuitry 209 is dedicated hardware, the processing circuitry 209 is, for example, a single circuit, a composite circuit, a programmed processor, a parallel-programmed processor, an ASIC, or an FPGA; or a combination of them.

Note that ASIC stands for Application Specific Integrated Circuit, and FPGA stands for Field Programmable Gate Array.

The management device 200 may be provided with a plurality of processing circuitries that substitutes for the processing circuitry 209. The plurality of processing circuitries share a role of the processing circuitry 209.

In the processing circuitry 209, some of the functions may be implemented by dedicated hardware, and the remaining functions may be implemented by software or firmware.

In this manner, the processing circuitry 209 can be implemented by hardware, software, or firmware; or a combination of them.

Figure 23:
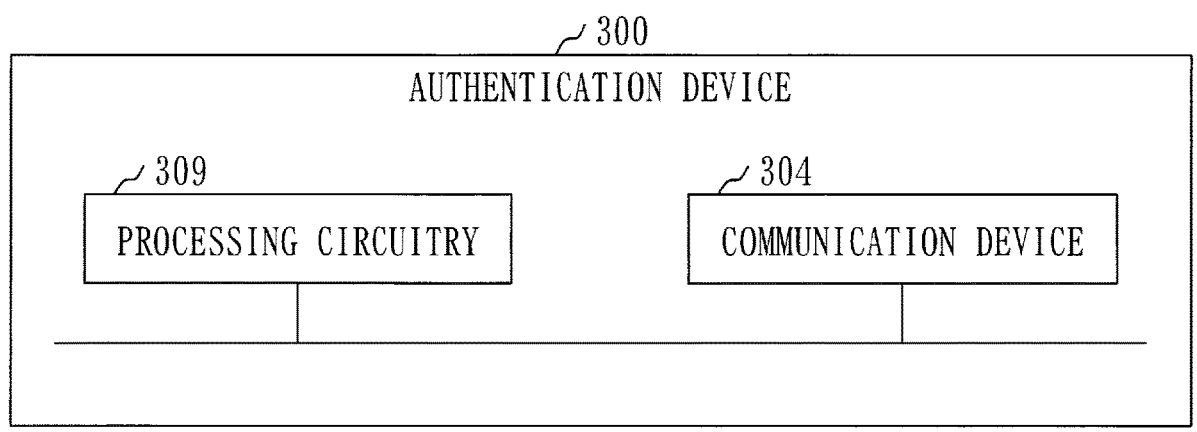
FIG. 23 is a hardware configuration diagram of the authentication device 300 in each embodiment.

A hardware configuration of the authentication device 300 will be described with referring to FIG. 23.

The authentication device 300 is provided with processing circuitry 309.

The processing circuitry 309 is hardware that implements the authentication unit 311, the proxy certification unit 312, the logout accepting unit 313, the authentication information storage unit 391, and the client private key storage unit 392.

The processing circuitry 309 may be dedicated hardware, or may be a processor 301 that executes the program stored in the memory 302.

If the processing circuitry 309 is dedicated hardware, the processing circuitry 309 is, for example, a single circuit, a composite circuit, a programmed processor, a parallel-programmed processor, an ASIC, or an FPGA; or a combination of them.

The authentication device 300 may be provided with a plurality of processing circuitries that substitute for the processing circuitry 309. The plurality of processing circuitries share a role of the processing circuitry 309.

In the processing circuitry 309, some of the functions may be implemented by dedicated hardware, and the remaining functions may be implemented by software or hardware.

In this manner, the processing circuitry 309 can be implemented by hardware, software, or firmware; or a combination of them.

Figure 24:
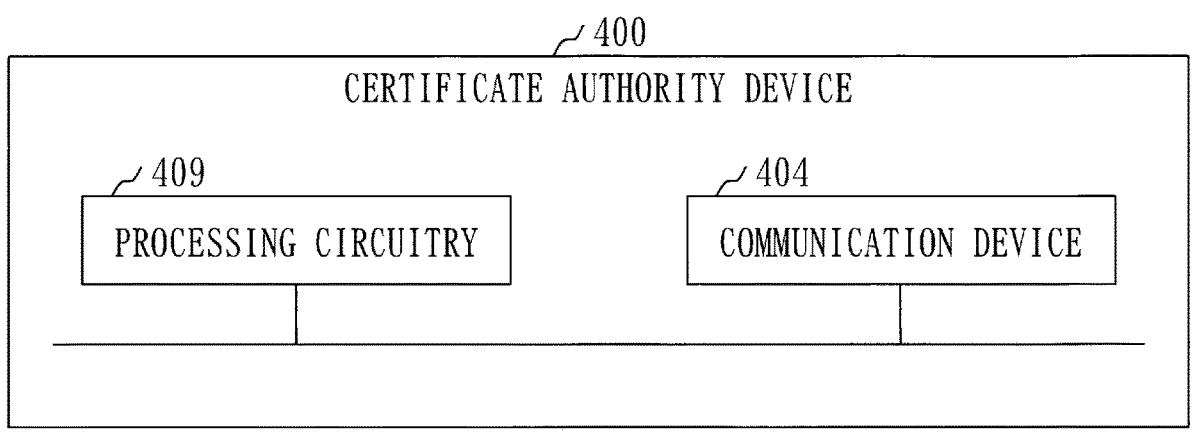
FIG. 24 is a hardware configuration diagram of the certificate authority device 400 in each embodiment.

A hardware configuration of the certificate authority device 400 will be described with referring to FIG. 24.

The certificate authority device 400 is provided with processing circuitry 409.

The processing circuitry 409 is hardware that implements a private key generation unit 411 and a certificate generation unit 412.

The processing circuitry 409 may be dedicated hardware, or may be a processor 401 that implements the program stored in the memory 402.

If the processing circuitry 409 is dedicated hardware, the processing circuitry 409 is, for example, a single circuit, a composite circuit, a programmed processor, a parallel-programmed processor, an ASIC, or an FPGA; or a combination of them.

The certificate authority device 400 may be provided with a plurality of processing circuitries that substitute for the processing circuitry 409. The plurality of processing circuitries share a role of the processing circuitry 409.

In the processing circuitry 409, some of the functions may be implemented by dedicated hardware, and the remaining functions may be implemented by software or firmware.

In this manner, the processing circuitry 409 can be implemented by hardware, software, or firmware; or a combination of them.

Each embodiment is an exemplification of a preferred mode and is not intended to limit the technical scope of the present invention. Each embodiment may be practiced partly, or may be practiced in combination with another embodiment. The procedures described with referring to the flowcharts and so on may be changed appropriately.

REFERENCE SIGNS LIST

100: authentication federation system; 101: internet; 110: organization system; 110A: first organization system; 110B: second organization system; 110C: third organization system; 111: intranet; 112: gateway device; 120: authentication system; 121: transaction data; 121A: basic information; 121B: owner information; 121C: certificate authority certificate; 121D: other information; 122: transaction data; 122A: basic information; 122B: owner information; 122C: client certificate; 122D: other information; 123: transaction data; 123A: basic information; 123B: client certificate information; 123C: other information; 130: user terminal; 130G: user terminal group; 131A: processor; 131B: memory; 131C: auxiliary storage device; 131D: communication device; 131E: input/output interface; 132: browser unit; 133: key management unit; 140: server device; 140G: server device group; 141A: processor; 141B: memory; 141C: auxiliary storage device; 141D: communication device; 142: application unit; 200: management device; 201: processor; 202: memory; 203: auxiliary storage device; 204: communication device; 209: processing circuitry; 211: transaction issuing unit; 212: transaction accepting unit; 213: certificate verification unit; 214: blockchain management unit; 215: transaction verification unit; 290: blockchain storage unit;

300: authentication device; 301: processor; 302: memory; 303: auxiliary storage device; 304: communication device; 309: processing circuitry; 311: authentication unit; 312: proxy certification unit; 313: logout accepting unit; 391: authentication information storage unit; 392: client private key storage unit; 400: certificate authority device; 401: processor; 402: memory; 403: auxiliary storage device; 404: communication device; 409: processing circuitry; 411: private key generation unit; 412: certificate generation unit; 490: certificate authority private key storage unit.

The invention claimed is:

1. An authentication system for providing authentication federation among a plurality of service providing organizations including a first organization that a first user belongs to and another organization which provides a service, the authentication system comprising:
first processing circuitry, at the first organization, configured to issue a registration transaction for a client certificate of the first user before the first user accesses a service of the another organization from a user terminal of the first organization and store a client private key of the first user in response to receipt of a registration completion notice; and
second processing circuitry, at the first organization, configured to receive a hello message from processing circuitry at said another organization system, in response to the first user requesting access to the service of said another organization from the user terminal of the first organization, encrypt the hello message using a client private key of the first user, and send the encrypted hello message to said another organization system as a signature message, wherein
said processing circuitry at said another organization accepts the registration transaction for the client certificate of the first user, registers the client certificate of the first user in a client certificate blockchain, sends, when the first user accesses the service of said another organization from the user terminal of the first organization, the hello message to the authentication system, receives the signature message from the authentication system, verifies the signature message using the client certificate of the first user in the client certificate blockchain, and if the signature message is correct, authenticates the first user is a legitimate user,
said processing circuitry at said another organization acquires a client public key of the first user from the client certificate of the first user, decrypts the signature message using the client public key of the first user, and if the decrypted signature message matches the hello message, decides that the signature message is correct,
when the first user logs out, the first processing circuitry is further configured to issue a revocation transaction for the client certificate of the first user, and
said processing circuitry at said another organization accepts the revocation transaction for the client certificate of the first user, registers the client certificate of the first user in a revocation list blockchain, checks, when the first user accesses the service of said another organization from the user terminal of the first organization, whether the client certificate of the first user is registered in the revocation list blockchain, and if the client certificate of the first user is not registered in the revocation list blockchain, sends the hello message to the authentication system.

2. The authentication system according to claim 1, wherein the first processing circuitry is further configured to issue a registration transaction for a certificate authority certificate of the first organization, and
wherein said processing circuitry at said another organization system accepts the registration transaction for the certificate authority certificate of the first organization, registers the certificate authority certificate of the first organization in a certificate authority certificate blockchain, verifies the client certificate of the first user, when the registration transaction for the client certificate of the first user is accepted, using the certificate authority certificate of the first organization in the certificate authority certificate blockchain, and if the client certificate of the first user is correct, registers the client certificate of the first user in the client certificate blockchain.

3. The authentication system according to claim 2, further comprising:
third processing circuitry, as the first organization, configured to generate a signature using a certificate authority private key of the first organization, and to generate the client certificate of the first user to include the generated signature, and
wherein said processing circuitry at said another organization acquires a certificate authority public key of the first organization from the certificate authority certificate of the first organization when the registration transaction for the client certificate of the first user is accepted, verifies the signature using the certificate authority public key of the first organization, and if the signature is correct, decides that the client certificate of the first user is correct.

4. The authentication system according to claim 1, wherein the first processing circuitry is further configured to issue a registration transaction for a certificate authority certificate of the first organization, and
wherein said processing circuitry at said another organization system accepts the registration transaction for the certificate authority certificate of the first organization, registers the certificate authority certificate of the first organization in a certificate authority certificate blockchain, verifies the client certificate of the first user, when the registration transaction for the client certificate of the first user is accepted, using the certificate authority certificate of the first organization in the certificate authority certificate blockchain, and if the client certificate of the first user is correct, registers the client certificate of the first user in the client certificate blockchain.

5. The authentication system according to claim 4, further comprising:
third processing circuitry, at the first organization, configured to generate a signature using a certificate authority private key of the first organization, and to generate the client certificate of the first user to include the generated signature, and
wherein said processing circuitry at said another organization acquires a certificate authority public key of the first organization from the certificate authority certificate of the first organization when the registration transaction for the client certificate of the first user is accepted, verifies the signature using the certificate authority public key of the first organization, and if the signature is correct, decides that the client certificate of the first user is correct.

6. The authentication system according to claim 1,
wherein when the first user logs out, the first processing circuitry is further configured to issue a revocation transaction for the client certificate of the first user, and
wherein said processing circuitry at said another organization accepts the revocation transaction for the client certificate of the first user, registers the client certificate of the first user in a revocation list blockchain, checks, when the first user accesses the service of said another organization from the user terminal of the first organization, whether the client certificate of the first user is registered in the revocation list blockchain, and if the client certificate of the first user is not registered in the revocation list blockchain, sends the hello message to the authentication system.

7. The authentication system according to claim 4,
wherein when the first user logs out, the first processing circuitry is further configured to issue a revocation transaction for the client certificate of the first user, and
wherein said processing circuitry at said another organization accepts the revocation transaction for the client certificate of the first user, registers the client certificate of the first user in a revocation list blockchain, checks, when the first user accesses the service of said another organization from the user terminal of the first organization, whether the client certificate of the first user is registered in the revocation list blockchain, and if the client certificate of the first user is not registered in the revocation list blockchain, sends the hello message to the authentication system.

8. An authentication system for providing authentication federation among a plurality of service providing organization including a first organization that a first user belongs to and another organization which provides a service, the authentication system comprising:
    second processing circuitry, at the first organization, configured to receive a hello message from processing circuitry at said another organization in response to the first user requesting access to a service of said another organization from a user terminal of the first organization, encrypt the hello message using a client private key of the first user, and send the encrypted hello message to said another organization system as a signature message; and
    first processing circuitry, at the first organization, configured to issue a revocation transaction for a client certificate of the first user when the first user logs out of the user terminal of the first organization,
    wherein said processing circuitry at said another organization acquires a client public key of the first user from the client certificate of the first user, decrypts the signature message using the client public key of the first user, and if the decrypted signature message matches the hello message, decides that the signature message is correct, and
    said processing circuitry at said another organization accepts the revocation transaction for the client certificate of the first user, registers the client certificate of the first user in a revocation list blockchain, checks, when the first user accesses the service of said another organization from the user terminal of the first organization, whether the client certificate of the first user is registered in the revocation list blockchain, sends, if the client certificate of the first user is not registered in the revocation list blockchain, the hello message to the authentication system, receives the signature message from the authentication system, verifies the signature message using the client certificate of the first user, and if the signature message is correct, decides that the first user is a legitimate user.

9. A non-transitory computer readable medium storing an authentication program for an authentication system for providing authentication federation among a plurality of service providing organizations including a first organization that a first user belongs to another organization which provides a service, the authentication program causing a computer to execute:
    a transaction issuing process, at the first organization, of issuing a registration transaction for a client certificate of the first user before the first user accesses a service of the another organization from a user terminal of the first organization; and
    a proxy certification process, at the first organization, of receiving a hello message from processing circuitry at said another organization in response to the first user requesting access to the service of said another organization from a user terminal of the first organization, encrypting the hello message using a client private key of the first user, and sending the encrypted hello message to said another organization system as a signature message,
    wherein said processing circuitry at said another organization accepts the registration transaction for the client certificate of the first user, registers the client certificate of the first user in a client certificate blockchain, sends, when the first user accesses the service of said another organization from the user terminal of the first organization, the hello message to the authentication system, receives the signature message from the authentication system, verifies the signature message using the client certificate of the first user in the client certificate blockchain, and if the signature message is correct, decides that the first user is a legitimate user,
    said processing circuitry at said another organization acquires a client public key of the first user from the client certificate of the first user, decrypts the signature message using the client public key of the first user, and if the decrypted signature message matches the hello message, decides that the signature message is correct,
    when the first user logs out, the first processing circuitry is further configured to issue a revocation transaction for the client certificate of the first user, and
    said processing circuitry at said another organization accepts the revocation transaction for the client certificate of the first user, registers the client certificate of the first user in a revocation list blockchain, checks, when the first user accesses the service of said another organization from the user terminal of the first organization, whether the client certificate of the first user is registered in the revocation list blockchain, and if the client certificate of the first user is not registered in the revocation list blockchain, sends the hello message to the authentication system.

10. A non-transitory computer readable medium storing an authentication program for an authentication system for providing authentication federation among a plurality of service providing organizations including a first organization that a first user belongs to and another organization which provides a service, the authentication program causing a computer to execute:

a proxy certification process, at the first organization, of receiving a hello message from processing circuitry at said another organization in response to the first user requesting access a service of the another organization from a user terminal of the first organization, encrypting the hello message using a client private key of the first user, and sending the encrypted hello message to said another organization system as a signature message; and a transaction issuing process, at the first organization, of issuing a revocation transaction for a client certificate of the first user when the first user logs out at the user terminal, wherein said processing circuitry at said another organization acquires a client public key of the first user from the client certificate of the first user, decrypts the signature message using the client public key of the first user, and if the decrypted signature message matches the hello message, decides that the signature message is correct, and said processing circuitry at said another organization accepts the revocation transaction for the client certificate of the first user, registers the client certificate of the first user in a revocation list blockchain, checks, when the first user accesses the service of said another organization from the user terminal of the first organization, whether the client certificate of the first user is registered in the revocation list blockchain, sends, if the client certificate of the first user is not registered in the revocation list blockchain, the hello message to the authentication system, receives the signature message from the authentication system, verifies the signature message using a client certificate of the first user, and if the signature message is correct, decides, that the first user is a legitimate user.

11. An authentication system for providing authentication federation among a plurality of service providing organizations including a first organization that a first user belongs to and another organization which provides a service, the authentication system comprising:

first processing circuitry, at said another organization, configured to accept a registration transaction for a client certificate of the first user from processing circuitry at the first organization, register the client certificate of the first user in a client certificate blockchain; and second processing circuitry, at said another organization, configured to send, in response to the first user requesting access to the service of said another organization from the user terminal of the first organization, a hello message to said processing circuitry at said first organization, receive a signature message from the processing circuitry at the first organization, verify the signature message using the client certificate of the first user in the client certificate blockchain, and if the signature message is correct, authenticate the first user is a legitimate user, wherein said processing circuitry at said first organization receives the hello message from first processing circuitry in response to the first user requesting access to the service of said another organization from the user terminal, encrypts the hello message using a client private key of the first user, and sends the encrypted hello message to said second processing circuitry as the signature message, and said processing circuitry at said another organization acquires a client public key of the first user from the client certificate of the first user, decrypts the signature message using the client public key of the first user, and if the decrypted signature message matches the hello message, decides that the signature message is correct.

12. An authentication system for providing authentication federation among a plurality of service providing organization including a first organization that a first user belongs to and another organization which provides a service, the authentication system comprising:

first processing circuitry at said another organization configured to accept a revocation transaction for a client certificate of the first user, register the client certificate of the first user in a revocation list blockchain, check, in response the first user requesting access to the service of said another organization from the user terminal of the first organization, whether the client certificate of the first user is registered in the revocation list blockchain; and second processing circuitry, at said another organization, configured to send, if the client certificate of the first user is not registered in the revocation list blockchain, a hello message to processing circuitry at the first organization, receives a signature message from the processing circuitry at the first organization, verify the signature message using the client certificate of the first user, and if the signature message is correct, authenticate the first user is a legitimate user, wherein said processing circuitry at the first organization, receives the hello message from second processing circuitry in response to the first user requesting access to the service of said another organization, encrypts the hello message using a client private key of the first user, and sends the encrypted hello message to said another organization system as the signature message, and said processing circuitry at said another organization acquires a client public key of the first user from the client certificate of the first user, decrypts the signature message using the client public key of the first user, and if the decrypted signature message matches the hello message, decides that the signature message is correct.

* * * * *